United States Patent
Bahm

(10) Patent No.: US 11,765,127 B1
(45) Date of Patent: Sep. 19, 2023

(54) PLUGGABLE NETWORK ADDRESS MANAGEMENT STACK

(71) Applicant: Dell Products, L.P., Round Rock, TX (US)

(72) Inventor: Alexander Bahm, Bellevue, WA (US)

(73) Assignee: DELL PRODUCTS, L.P., Round Rock, TX (US)

( * ) Notice: Subject to any disclaimer, the term of this patent is extended or adjusted under 35 U.S.C. 154(b) by 0 days.

(21) Appl. No.: 17/659,929

(22) Filed: Apr. 20, 2022

(51) Int. Cl.
- *H04L 12/28* (2006.01)
- *H04B 7/24* (2006.01)
- *G06F 15/177* (2006.01)
- *H04L 61/5007* (2022.01)
- *H04L 61/5046* (2022.01)

(52) U.S. Cl.
CPC ...... *H04L 61/5007* (2022.05); *H04L 61/5046* (2022.05)

(58) Field of Classification Search
CPC .................. H04L 61/5007; H04L 61/5046
See application file for complete search history.

(56) References Cited

U.S. PATENT DOCUMENTS

| | | | | |
|---|---|---|---|---|
| 8,135,811 B2 * | 3/2012 | Bodin | .................. | H04L 12/281 709/228 |
| 2003/0177218 A1 * | 9/2003 | Poirot | ................. | H04L 43/0817 709/223 |
| 2016/0248726 A1 * | 8/2016 | Kolesnik | ............. | H04L 61/5007 |
| 2016/0373405 A1 * | 12/2016 | Miller | ................. | H04L 63/0236 |
| 2019/0034243 A1 * | 1/2019 | Kramer | ................. | G06F 9/4401 |
| 2019/0095616 A1 * | 3/2019 | Drapeau | ............... | G06F 21/566 |
| 2020/0097256 A1 * | 3/2020 | Marin | ..................... | H04L 9/002 |
| 2022/0083436 A1 * | 3/2022 | Haque | .................... | G06F 9/445 |

OTHER PUBLICATIONS

Pacemaker is an advanced, scalable High-Availability cluster resource manager, www.clusterlabs.org/pacemaker/, last accessed Apr. 25, 2022, 3 pgs.
The Corosync Cluster Engine, corosync.github.io/corosync/, last accessed Apr. 25, 2022, 4 pgs.
Interface hooks, https://snapcraft.io/docs/interface-hooks, last accessed Apr. 25, 2022, 3 pgs.
Netctl—ArchWiki, netctl (https://gitlab.archlinux.org/archlinux/netctl), last accessed Apr. 25, 2022, 16 pgs.

* cited by examiner

*Primary Examiner* — Christopher B Robinson
(74) *Attorney, Agent, or Firm* — Amin, Turocy & Watson, LLP

(57) ABSTRACT

Network address configuration in distributed node networks can be performed and managed. A network management component (NMC) can determine a group of hooks, and an order of respective hooks of the group in a network address management stack, that can be utilized to configure a network address on an interface associated with a group of nodes based on characteristics associated with a node or interface configuration system. NMC can execute the group of hooks in order at runtime to facilitate configuration of the network address on the interface. NMC can execute respective threads of a hook stack in parallel for respective network addresses. NMC can modify a hook(s) in a hook group in response to a change in characteristics associated with the node or interface configuration system. NMC can determine another group of hooks and hook order that can be executed to remove the network address from the interface.

20 Claims, 13 Drawing Sheets

PLUGGABLE NETWORK ADDRESS MANAGEMENT STACK

TECHNICAL FIELD

This disclosure relates generally to distributed node networks, e.g., a pluggable network address management stack.

BACKGROUND

A group (e.g., cluster) of nodes can provide a set of services to clients. The nodes of the group can be connected to each other to form a distributed network of nodes. Each service to which a client can connect can have one or more Internet protocol (IP) addresses in an IP address space. At various times, a node can have many (e.g., dozens or even more than one hundred) IP addresses configured on the node.

The above-described description is merely intended to provide a contextual overview regarding distributed node networks, and is not intended to be exhaustive.

SUMMARY

The following presents a simplified summary in order to provide a basic understanding of some aspects described herein. This summary is not an extensive overview of the disclosed subject matter. It is intended to neither identify key or critical elements of the disclosure nor delineate the scope thereof. Its sole purpose is to present some concepts in a simplified form as a prelude to the more detailed description that is presented later.

In some embodiments, the disclosed subject matter can comprise a method that can comprise determining, by a system comprising a processor, a group of hooks that is to be utilized to configure a network address on an interface associated with a group of nodes based at least in part on a characteristic associated with a node of the group of nodes. The method further can comprise executing, by the system, the group of hooks at runtime to facilitate the configuration of the network address on the interface.

In certain embodiments, the disclosed subject matter can comprise a system that can include a memory that stores computer executable components, and a processor that executes computer executable components stored in the memory. The computer executable components can comprise a network management component that can determine a group of hooks that is to be utilized to configure a network address on an interface associated with a group of nodes based at least in part on an attribute associated with a node of the group of nodes or an interface configuration system associated with the group of nodes. The computer executable components also can include an execution component that can execute the group of hooks at runtime to facilitate the configuration of the network address on the interface.

In still other embodiments, a non-transitory machine-readable medium, comprising executable instructions that, when executed by a processor, facilitate performance of operations. The operations can comprise determining a set of hooks, and an order of execution of respective hooks of the set of hooks, that is to be employed to configure a network address on an interface associated with a set of nodes based at least in part on a characteristic associated with a node of the set of nodes or an interface configuration system associated with the set of nodes, wherein the respective hooks comprise respective network address configuration operations. The operations also can comprise executing the respective hooks of the set of hooks at runtime, in accordance with the order, to facilitate the configuration of the network address on the interface.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and features will become apparent from the following detailed description when considered in conjunction with the drawings.

DETAILED DESCRIPTION

Figure 1:
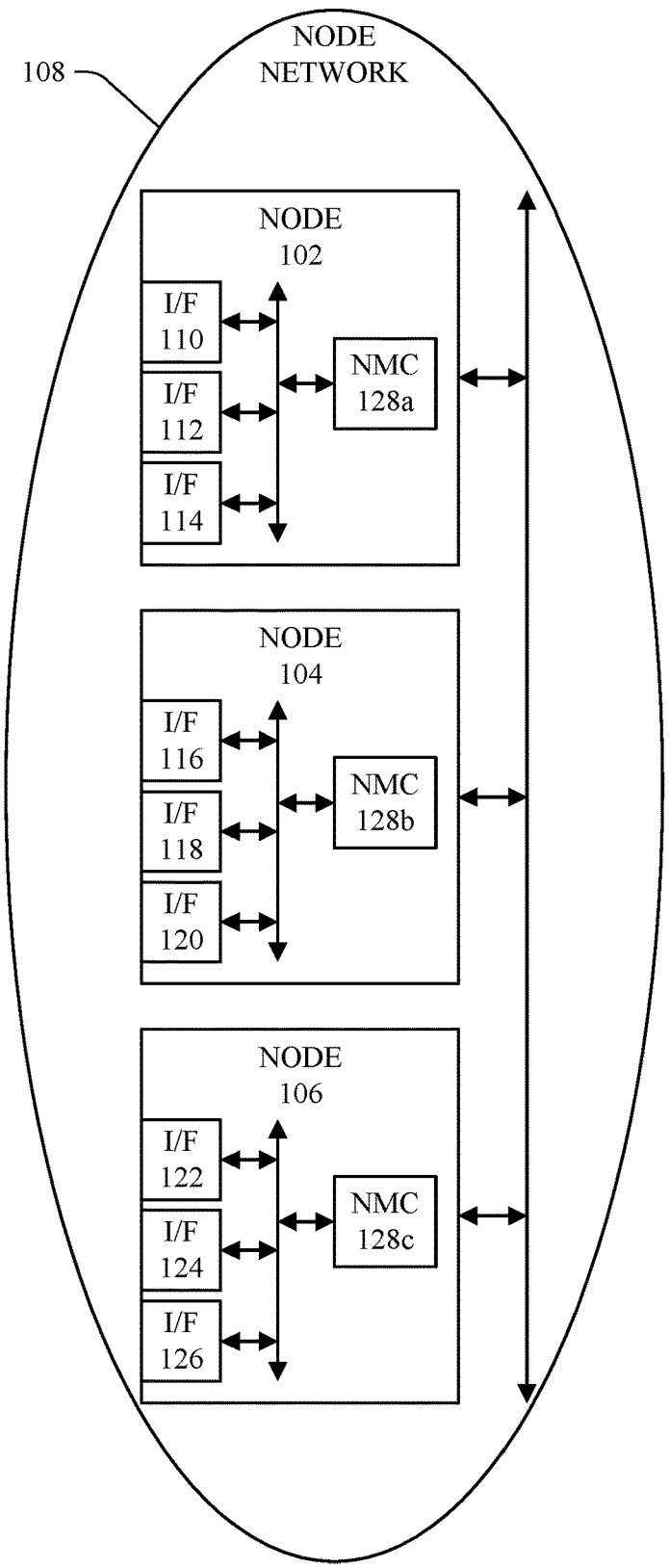
FIG. 1 illustrates a block diagram of an example system that can desirably perform and manage network address configuration and removal in distributed node networks, in accordance with various aspects and embodiments of the disclosed subject matter.

Various aspects of the disclosed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

A group (e.g., cluster) of nodes can provide a set of services to clients. The nodes of the group can be connected to each other to form a distributed network of nodes. Each service to which a client can connect can have one or more Internet protocol (IP) addresses in an IP address space. At various times, a node can have many (e.g., dozens or even more than one hundred) IP addresses configured on the node.

Some types of distributed node network systems can be structured such that the distributed node network system has to coordinate with its file protocols. By having a distributed node network system coordinate with its file protocols, this can allow for less disruptive IP address failover. However, managing IP addresses in a distributed node network system that has to coordinate with its file protocols can be complicated and challenging. Also, regardless of whether a distributed node network system has to coordinate with its file protocols, depending on the IP address, node network, or other configuration, there can be a variety of operations that have to run on each individual IP address. Managing and/or adding these checks and operations can result in an undesirably (e.g., excessively, inefficiently, unacceptably, or unsuitably) complicated and entangled nest of code. In some cases, the operations can be time consuming and can be considered blocking operations. Having potentially blocking operations when there can be many (e.g., potentially dozens or even more than one hundred) IP addresses on a single node can be problematic if the operations have to be performed serially and fast failover of IP addresses is desired (e.g., wanted or useful).

Existing approaches for managing IP addresses can involve the use of undesirably complicated and fragile logic to perform the checks in order for each IP address on a single thread. In many cases, this can result in blocks of code that verify a first condition on all IP addresses, then verify a second condition on all IP addresses, then configure all of the IP addresses, and then verify all of the IP addresses. One problem with such existing approach can be that, if conditions have to be added to the IP address configuration process, it can undesirably slow down all operations as all of the IP addresses have to be checked with regard to these added conditions as well as the existing conditions. Also, with existing approaches, there may be no suitable way to add blocking calls on a per IP address basis, as adding blocking calls on a per IP address basis can undesirably (e.g., unacceptably or inefficiently) slow down all node network system operations.

The disclosed subject matter can overcome these and other deficiencies of existing approaches for managing IP addresses. The techniques of the disclosed subject matter can employ a hook-based model and pluggable network address (e.g., IP address) management stack that can provide desirable end functionality with regard to managing network addresses while also allowing the upper layers of an application to submit network address requests to configure all desired network addresses without individually having to perform platform-specific or network address-specific checks and while also enabling desirably faster operation by allowing function calls to be performed asynchronously if and as desired. Further, the disclosed subject matter, by employing the hook-based model, can more desirably (e.g., more easily, suitably, efficiently, or optimally) add hooks because each hook can have a desirably strict contract so that each hook can be tested in isolation versus potentially changing contracts of the overall application.

To that end, techniques for desirably (e.g., efficiently, suitably, or optimally) performing and managing network address configuration and removal in distributed node networks are presented. A system (e.g., a distributed node network system) can comprise a group of nodes that can be utilized to process information and provide services to clients (e.g., users and communication devices of users). Each node of the group of nodes can comprise one or more interfaces, wherein network addresses (e.g., IP addresses, which can include virtual IP addresses) can be configured to be on (e.g., associated with) the interfaces. In some embodiments, the nodes of the group of nodes can be associated with (e.g., communicatively connected to or networked with) the other nodes of the group of nodes.

In accordance with various embodiments, the disclosed subject matter can comprise a network management component (NMC) that desirably perform and manage network address configuration and removal in distributed node networks. In some embodiments, an NMC can reside on each node. In other embodiments, an NMC can reside on one or more of the nodes, and can be associated with (e.g., communicatively connected to) all of the nodes of the group of nodes.

To facilitate configuring network addresses (e.g., IP addresses) on interfaces, the NMC can determine a network address management stack comprising a group of hooks, and an order (e.g., an order or a sequence of execution) of respective hooks of the group of hooks, that can be utilized to configure a network address on an interface associated with a group of nodes based at least in part on characteristics associated with an application, an operating system, an interface configuration system (e.g., interface configuration system that can be associated with a group of interfaces associated with the group of nodes), and/or a hardware or virtualization platform associated with the group of nodes. Hooks can be or can comprise functions, scripts, and/or executable code that can be employed or executed to perform desired operations, such as described herein. The characteristics can comprise or relate to, for example, a software or firmware version, configuration, application type, or other characteristic associated with the application, a software or firmware version, configuration, operating system type, or other characteristic associated with the operating system, a configuration, interface configuration system type, or other characteristic associated with the interface configuration system, a configuration of the interface configuration system, and/or a configuration, platform type, or other characteristic associated with the hardware or virtualization platform associated with the application, operating system, and/or interface configuration system. The group of hooks can be part of a network address management stack (e.g., stack of hooks). Respective hooks of the group of hooks can comprise respective configuration operations that can be performed to facilitate configuring the network address on the interface and/or ensuring that the network address is desirably (e.g., suitably, correctly, or optimally) configured on the interface. The NMC can determine respective (e.g., different or customized) network address management stacks (e.g., different groups of hooks and different hook orders) for respective types of operating systems, respective interface configuration systems, and/or respective hardware or virtualization platforms.

With regard to one or more network address requests (e.g., received from an upper layer of the application and/or initiated by an entity (e.g., an administrator or certain types of systems, such as described herein) to configure one or more network addresses on one or more interfaces, in response to each network address request, an execution component can execute the group of hooks in order at runtime to facilitate configuration of the network address on the interface. In certain embodiments, in response to network address requests, the execution component can execute respective threads of the network address management stack (e.g., group of hooks comprising hooks in the determined order) in parallel for respective network addresses, such as described herein.

In some embodiments, in response to a change in characteristics associated with the application, operating system, interface configuration system, and/or hardware or software platform, the NMC can modify one or more hooks in the network address management stack (e.g., group of hooks) and/or the order of execution of the hooks of the stack. For instance, based at least in part on the change in the characteristics, the NMC can determine a modification that can be made to the network address management stack to account for such change in the characteristics and to generate a modified network address management stack, wherein the modification can comprise adding one or more hooks to the stack, removing one or more hooks from the stack, and/or rearranging the order of the hooks in the stack. For subsequent network address requests, the NMC can utilize (e.g., execute the hooks of) the modified network address management stack to desirably configure network addresses on interfaces associated with the group of nodes.

The NMC also can determine another network address management stack comprising another group of hooks, which can have another hook order, that can be utilized to remove a network address from an interface associated with the group of nodes. For instance, the NMC can determine the other group of hooks, and the other order of respective hooks of the other group of hooks, that can be utilized to remove a network address from an interface associated with the group of nodes based at least in part on the characteristics associated with the application, the operating system, the interface configuration system, and/or the hardware or virtualization platform. When removal of a network address from being configured on an interface associated with the group of nodes is desired (e.g., by the application, an entity, or the NMC (e.g., due to an inability to properly configure the network address on the interface, or due to a duplicate network address being detected)), the execution component can execute this other group of hooks in the other order at runtime to facilitate removal of the network address from the interface. In certain embodiments, the NMC also can determine a modification that can be made to one or more hooks of the other group of hooks of a network address management stack utilized for network address removal, based at least in part on the change in the characteristics associated with the application, operating system, interface configuration system, and/or hardware or software platform.

These and other aspects and embodiments of the disclosed subject matter will now be described with respect to the drawings.

Referring now to the drawings, FIG. 1 illustrates a block diagram of an example system 100 that can desirably (e.g., efficiently, suitably, or optimally) perform and manage network address configuration and removal in distributed node networks, in accordance with various aspects and embodiments of the disclosed subject matter. The system 100 can comprise a group (e.g., cluster) of nodes, which can comprise a desired number of nodes, including node 102, node 104, and node 106. The nodes (e.g., 102, 104, and/or 106) can be grouped or networked together to form a node network 108, such as a distributed node network.

Each node (e.g., 102, 104, and/or 106) can comprise, employ, and/or access data processing resources (e.g., processor(s)), storage resources (e.g., data store(s)), applications, and/or other resources that can enable the node to perform one or more services. The one or more services can be or can relate to, for example, data processing, video streaming, audio streaming, data security or protection, multimedia service, news service, financial service, social networking, and/or another desired type of service. The nodes can be associated with (e.g., communicatively connected to) each other, for example, through a back-end network.

Each node (e.g., 102, 104, and/or 106) also can comprise a desired number of interfaces (e.g., network or interconnect interfaces). For instance, node 102 can comprise a desired number of interfaces (I/Fs), comprising interface 110, interface 112, and/or interface 114; node 104 can comprise a desired number of interfaces, comprising interface 116, interface 118, and/or interface 120; and node 106 can comprise a desired number of interfaces, comprising interface 122, interface 124, and/or interface 126. The interfaces of a node (e.g., 102, 104, and/or 106) can be or can comprise network interfaces or other types of interfaces that can be associated with network addresses and can be utilized to facilitate (e.g., enable) transmitting or presenting information to a user or a device (e.g., service server, another node, or client or communication device, such as a computer, server, or mobile (e.g., smart) phone), or receiving information (e.g., query or request for a service; or request for information) from an application (e.g., an upper layer of the application), a service server, or a communication device.

To facilitate communication between an interface (e.g., 110, 112, 114, 116, 118, 120, 122, 124, or 126) of a node (e.g., 102, 104, or 106) and another device (e.g., communication device, server, or other type of device), a network address can be configured on the interface. At respective (e.g., various given) times, respective (e.g., different) network addresses can be configured on an interface. Network addresses can be of various types, versions, and/or formats, which can comprise, for example, IP version 4 (IPv4) (e.g., an IPv4 address can be a 32-bit IPv4 address), IP version 6 (IPv6) (e.g., an IPv6 address can be a 128-bit IPv6 address), and/or other desired type, version, and/or format of network address.

As disclosed herein, depending on the network address, node network, or other configuration, there can be a variety of operations that have to run on each individual network address. Managing and/or adding these checks and operations can result in an undesirably (e.g., excessively, inefficiently, unacceptably, or unsuitably) complicated and entangled nest of code. In some cases, the operations can be time consuming and can be considered blocking operations. Having potentially blocking operations when there can be many (e.g., potentially dozens or even more than one hundred) network addresses on a single node can be problematic if the operations have to be performed serially and fast failover of network addresses is desired (e.g., wanted or useful). Existing approaches for managing network addresses can involve the use of undesirably complicated and fragile logic to perform the checks in order for each network address on a single thread. Existing approaches can be undesirably inefficient with regard to the use of resources, time consuming, and inflexible, such as more fully described herein.

The disclosed subject matter can overcome these and other deficiencies of existing approaches. To that end, in accordance with various embodiments, the system 100 can comprise a network management component (NMC) 128 that can desirably (e.g., suitably, efficiently, reliably, enhancedly, or optimally) perform and manage network address configuration and removal in distributed node networks (e.g., node network comprising the nodes (e.g., 102, 104, and/or 106)). In some embodiments, each node (e.g., 102, 104, 106) can comprise an NMC (e.g., NMC 128a, NMC 128b, and NMC 128c, respectively) that can perform and manage network address configuration and removal for the respective interfaces (e.g., 110, 112, 114, 116, 118, 120, 122, 124, and/or 126) of the nodes (as depicted in the system 100 of FIG. 1). In other embodiments, an NMC 128 can reside in one (or more) of the nodes, or can be a standalone component, or can reside in another device or component, wherein the NMC 128 can be associated with (e.g., communicatively connected to) all of the nodes, and can perform and manage network address configuration and removal for all of the interfaces of all of the nodes of the node network 108.

Figure 2:
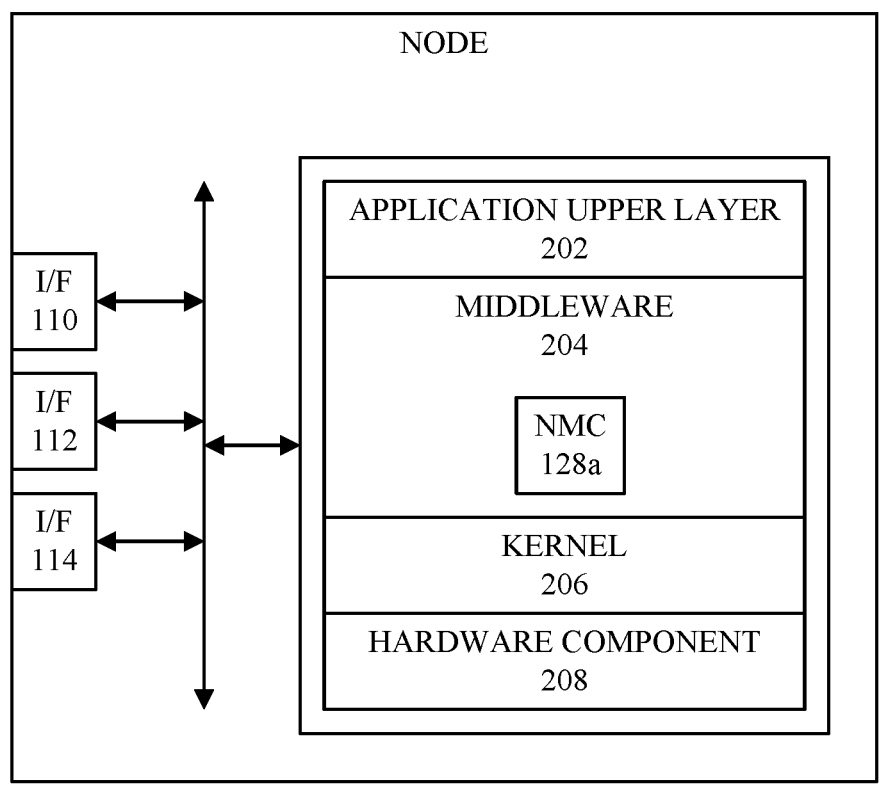
FIG. 2 depicts a block diagram of an example node, in accordance with various aspects and embodiments of the disclosed subject matter.

Referring to FIG. 2 (along with FIG. 1), FIG. 2 depicts a block diagram of an example node 102, in accordance with various aspects and embodiments of the disclosed subject matter. The node 102 can comprise an application, which can include an application upper layer 202, middleware 204 (e.g., a middleware layer), a kernel 206, and a hardware layer 208. The application upper layer 202 can be associated with (e.g., communicatively connected to) the middleware 204, the middleware 204 can be associated with (e.g., communicatively connected to) the kernel 206, and the kernel can be associated with (e.g., communicatively connected to) the hardware layer 208. In some embodiments, the middleware 204 can comprise the NMC 128a. In certain embodiments, the other nodes (e.g., 104, 106) of the node network 108 can be configured similar to the node 102 (e.g., the other nodes each can comprise an application (e.g., upper layer of application), middleware, a kernel, and a hardware layer, wherein the middleware can comprise an NMC (e.g., 128b, 128c)).

The application upper layer 202 can be platform specific with regard to the operating system, hardware, and/or virtual machine (VM) on which the application upper layer 202 runs (e.g., operates). While one application (and application upper layer 202) is depicted in the node 102, it is to be appreciated and understood that the node can comprise one or more applications of one or more application types. Also, various desired applications can be installed on or removed from the node 102. The application can be utilized to perform various operations on and/or process data, and can provide or facilitate providing desired services to clients (e.g., via communication devices) associated with the node network 108, such as described herein.

The middleware 204 can perform various functions, including being a translation layer between the application upper layer 202 and the operating system, including the kernel 206, to facilitate enabling the application to perform its functions by translating information and operations of the application so that they can be understood by the operating system, including the kernel 206, where the operating system can interact and interface with the hardware layer 208 to have the hardware components (e.g., processor component, data store, memory, electronic circuitry and components) perform desired operations on and process data that can correspond with the operations being performed and the data being processed by the application.

In some embodiments, the node 102 can comprise and utilize an operating system, including the kernel 206, wherein the operating system can be of a particular operating system type. In certain embodiments, while the node 102 is utilizing a desired operating system, a virtual machine associated with the node 102 can employ a different operating system of a different operating system type, or the node 102 can emulate a different operating system of a different operating system type.

Depending on how the node network 108 is being implemented, the node network 108, or a node of the node network 108, can employ one or more of various different types of operating systems, can have a particular type of interface configuration system associated with the interfaces of the nodes, where the interface configuration system can have a particular type of configuration, and/or can have a particular type of hardware or virtualization platform that can be associated with the application, operating system, and/or interface configuration system. For example, in a first implementation, the node network 108 or a particular node (e.g., 102) can comprise or employ a first type of operating system, a first type of interface configuration system, a first type of configuration of the interface configuration system, and/or a first type of hardware or virtualization platform. As further example, in a second implementation, the node network 108 or a particular node (e.g., 102) can comprise or employ a second (or the first) type of operating system, a second (or the first) type of interface configuration system, a second (or the first) type of configuration of the interface configuration system, and/or a second (or the first) type of hardware or virtualization platform, wherein the second implementation can be different from the first implementation.

At various times, the application upper layer 202 can desire to have one or more network addresses configured on one or more interfaces (e.g., 110, 112, 114, 116, 118, 120, 122, 124, and/or 126) of one or more nodes (e.g., 102, 104, and/or 106) of the node network 108. For instance, in response to a request made by an entity and received by the application upper layer 202, or in connection with various operations that the application can desire to perform (e.g., based on the application upper layer 202 monitoring the platform and/or querying platform data stores (e.g., reading files) that can indicate what network addresses are desired to be configured on what interfaces), the application upper layer 202 can transmit a network address request to the NMC 128a to request that one or more network addresses be respectively configured on one or more interfaces of one or more nodes of the node network 108. In some embodiments, a network address request can request that a single network address be configured on an interface. In other embodiments, a network address request can be a bulk request that can request multiple network addresses be configured such that each network address of the multiple network addresses be respectively configured on an interface of multiple interfaces (e.g., request that a first network address be configured on a first interface, a second network address be configured on a second interface, and/or another network address be configured on another interface) associated with the group of nodes (e.g., 102, 104, and/or 106). With further regard to the entity (e.g., when there is an entity that is initiating the request), the entity, for example, can be an administrator who can use a management control plane (e.g., setting screen, control panel, or other type of user interface) to configure or facilitate configuring network addresses and/or interfaces that the administrator desires (e.g., wants) to configure, or can be a certain system, such as a dynamic host configuration protocol (DHCP) system, DHCP version 6 (DHCPv6) system, stateless address auto-configuration (SLAAC) system, or other type of system that can inform the node (e.g., node 102) of network addresses and/or interfaces that the node should configure.

The disclosed subject matter, by employing the NMC and the techniques described herein, can desirably determine, customize, and/or adapt operations that can be performed to configure network addresses on interfaces of the node network 108 and remove network addresses from interfaces of the node network 108.

Figure 3:
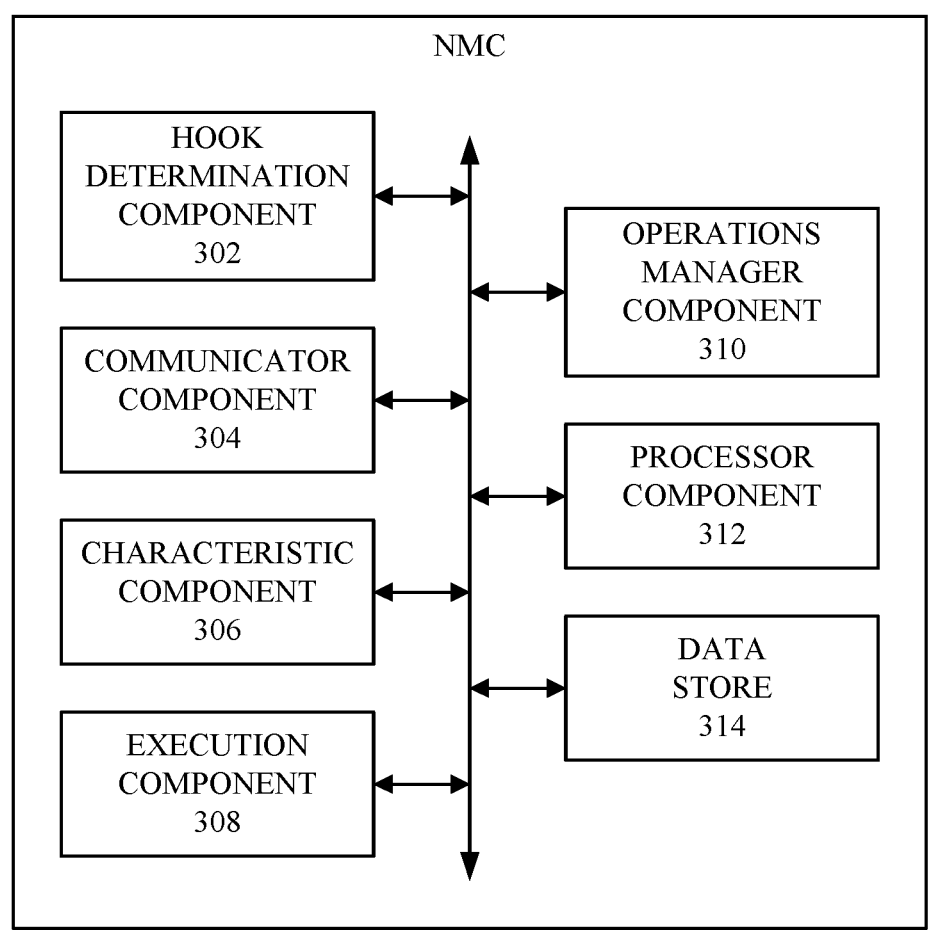
FIG. 3 depicts a block diagram of an example network management component, in accordance with various aspects and embodiments of the disclosed subject matter.

Referring to FIG. 3 (along with FIGS. 1 and 2), FIG. 3 illustrates a block diagram of the NMC 128a, in accordance with various aspects and embodiments of the disclosed subject matter. In some embodiments, the NMCs (e.g., 128b, 128c) of the other nodes (e.g., 104, 106) of the node network 108 can comprise the same or similar components and functionality as the NMC 128a, and/or can be configured the same as or similar to the NMC 128a. In certain embodiments, as part of the operations, the NMC 128a can determine, customize, and/or adapt a network address management stack (e.g., a pluggable network address management stack), comprising a group of hooks, that can be executed to configure network addresses (e.g., IP addresses, which can include virtual IP addresses) on interfaces of the node network 108, in accordance with the defined network management criteria. The NMC 128a also can determine, customize, and/or adapt another network address management stack, comprising another group of hooks, that can be executed to remove (e.g., disassociate or disconfigure) network addresses from interfaces of the node network 108, in accordance with the defined network management criteria. The network address management stack can handle and perform the preparation (e.g., pre-configuration or pre-removal) work for adding or removing a network address to or from an interface; adding or removing the network address to or from the interface; if desired (e.g., wanted, required, or necessary), verifying configuration of the network address on the interface was successful; post network address or removal operations and activities; and/or the notification of other components or subsystems (e.g., another node(s), interface configuration system, or other dependent component of subsystem) of the configuration of the network address on the interface or the removal of the network address from the interface. In certain embodiments, if polling and/or monitoring is desired, for example, for polling loops (e.g., polling loops of an indefinite lifetime), the application upper layer 202 or the middleware 204 can implement such polling and/or monitoring at a higher level (e.g., a higher level than the network address management stack) to manage and/or maintain the network addresses (e.g., using a network address coordinator (not shown) to perform such polling and/or monitoring to facilitate managing and/or maintaining the network addresses).

The NMC 128a, the network address management stacks, and the techniques described herein for managing configuration of network addresses on interfaces and removal of network addresses from interfaces can more desirably (e.g., suitably, efficiently, enhancedly, or optimally) develop new checks or operations on individual network addresses (e.g., via the development of hooks that can be plugged in to a network address management stack), can allow for multithreaded configuration (or removal) of network addresses on (or from) interfaces, and/or can allow for dynamic (e.g., automatic and/or dynamic) configuration of what hooks are to be run with regard to individual network addresses, such as more fully described herein. This can result in a dynamic, and desirably ordered, stack of hooks that can be configured at runtime. This can allow users (e.g., developers) to decouple the individual checks from the control flow, and can allow for parallel operations relating to configuration of network addresses on interfaces (or removal of network addresses from interfaces) to be performed (e.g., by the NMC 128a and the network address management stacks).

With regard to configuring a network address on an interface, hooks (e.g., interface hooks) can be employed to perform various types of operations prior to configuring the network address on the interface, perform operations to configure the network address on the interface, and/or perform various types of operations subsequent to configuring the network address on the interface, such as described herein. With regard to removing a network address from an interface, hooks can be employed to perform various types of operations prior to removing the network address from the interface, perform operations to remove the network address from the interface, and/or perform various types of operations subsequent to removing the network address from the interface, such as described herein.

The NMC 128a can comprise a hook determination component 302 that can determine, customize, and/or adapt a particular group of hooks (e.g., for configuring a network address on an interface, or for removing a network address from an interface) based at least in part on characteristics associated with the application, the operating system, the interface configuration system, and/or the hardware or virtualization platform. The characteristics associated with the application can comprise, for example, an application type of the application, a version (e.g., software or firmware version) of the application, an operating system on which the application can run, a configuration of the application, a protocol associated with the application, or another application-related characteristic. The characteristics associated with the operating system can comprise, for example, the operating system type of the operating system, a version (e.g., software or firmware version) of the operating system, a configuration of the operating system, a protocol associated with the operating system, or another operating system-related characteristic. The characteristics associated with the interface configuration system can comprise, for example, an interface configuration system type of the interface configuration system, a configuration of the interface configuration system, a protocol associated with the interface configuration system, or another desired characteristic relating to the interface configuration system. The characteristics associated with the hardware or virtualization platform can comprise, for example, the platform type of the hardware or virtualization platform, a configuration of the hardware or virtualization platform, a protocol associated with the hardware or virtualization platform, or another desired platform-related characteristic.

The NMC 128a can comprise a communicator component 304 that can receive information (e.g., characteristics-related information) relating to the characteristics associated with the application, operating system, interface configuration system, and/or hardware or virtualization platform from the application, operating system, interface configuration system, hardware or virtualization platform, and/or another data source (e.g., a communication device of a user who can provide such information, or a portion thereof; a database; or another desired data source). In accordance with various embodiments, the NMC 128a, via the communicator component 304, can receive the information relating to the characteristics during or in connection with initialization of the application, operating system, interface configuration system, and/or hardware or virtualization platform, during or in connection with a change (e.g., an update of software, firmware, or hardware; a change in configuration; or other type of change) associated with the application, operating system, interface configuration system, and/or hardware or virtualization platform, or at another desired time or in connection with the occurrence of another type of event or condition.

The NMC 128a can comprise a characteristics component 306 that can analyze the information (e.g., characteristics-related information) relating to the characteristics associated with the application, operating system, interface configuration system, and/or hardware or virtualization platform. Based at least in part on the results of the analysis of the information relating to the characteristics, the characteristics component 306 can determine or identify a group of characteristics associated with the application, a group of characteristics associated with the operating system, a group of characteristics associated with the interface configuration system, and/or a group of characteristics associated with the hardware or virtualization platform.

Based at least in part on the group of characteristics associated with the application, the group of characteristics associated with the operating system, the group of characteristics associated with the interface configuration system, and/or the group of characteristics associated with the hardware or virtualization platform, the hook determination component 302 can determine customize, and/or adapt a particular network address management stack, comprising a particular group of hooks, that can be utilized to configure a network address on an interface, and/or another network address management stack, comprising another group of hooks, that can be utilized to remove a network address from an interface. Depending on, and with regard to, respective implementations (e.g., a first implementation or a second implementation), the hook determination component 302 can determine respective groups of hooks, for example, such that the first group of hooks can comprise one or more hooks of a different hook type than the hooks of the second group of hooks, the first group of hooks can have a different number of hooks than the second group of hooks, and/or hooks of the first group of hooks can be arranged in a different order than hooks of the second group of hooks, based at least in part on the respective characteristics associated with the respective applications, the respective operating systems, the respective interface configuration systems, the respective hardware or virtualization platforms associated with the first implementation and the second implementation, in accordance with the defined network management criteria.

For instance, if the first example implementation is employed (e.g., by a first entity), based at least in part on a first group of characteristics associated with the application, a first group of characteristics associated with the operating system, a first group of characteristics associated with the interface configuration system, and/or a first group of characteristics associated with the hardware or virtualization platform, the hook determination component 302 can determine customize, and/or adapt a first network address management stack for network address configuration, comprising a first group of network address configuration-related hooks, that can be utilized to configure a network address on an interface associated with the group of nodes (e.g., 102, 104, and/or 106), and/or a first network address management stack for network address removal, comprising a first group of network address removal-related hooks, that can be utilized to remove a network address from an interface associated with the group of nodes. The first group of network address configuration-related hooks can be arranged in a first network address configuration-related order. The first group of network address removal-related hooks can be arranged in a first network address removal-related order.

If the second example implementation is employed (e.g., by a second entity), based at least in part on a second group of characteristics associated with the application, a second group of characteristics associated with the operating system, a second group of characteristics associated with the interface configuration system, and/or a second group of characteristics associated with the hardware or virtualization platform, the hook determination component 302 can determine customize, and/or adapt a second network address management stack for network address configuration, comprising a second group of network address configuration-related hooks, that can be utilized to configure a network address on an interface associated with the group of nodes (e.g., 102, 104, and/or 106), and/or a second network address management stack for network address removal, comprising a second group of network address removal-related hooks, that can be utilized to remove a network address from an interface associated with the group of nodes. The second group of network address configuration-related hooks can comprise one or more hooks that can be different from the first group of network address configuration-related hooks, and/or the second group of network address configuration-related hooks can be arranged in a second network address configuration-related order that can be different from the first network address configuration-related order, due in part to the difference in characteristics between the second example implementation and the first example implementation. The second group of network address removal-related hooks can comprise one or more hooks that can be different from the first group of network address removal-related hooks, and/or the second group of network address removal-related hooks can be arranged in a second network address removal-related order that can be different from the first network address removal-related order, due in part to the difference in characteristics between the second example implementation and the first example implementation.

In some embodiments, the hook determination component 302 can assign or associate respective index values (e.g., index numbers), which can range from a smallest index value to a largest index value, to or with respective hooks of a group of hooks of a network address management stack, in accordance with the order of the hooks in the group of hooks. In certain embodiments, if the group of hooks comprises pre-configuration hooks, a network address configuration hook, and post-configuration hooks, the hook determination component 302 can assign or associate an index value of 0 to the network address configuration hook, negative index values to the pre-configuration hooks, and positive index values to the post-configuration hooks (or alternatively, positive index values to the pre-configuration hooks, and negative index values to the post-configuration hooks). For example, if the group of hooks comprises two pre-configuration hooks, a network address configuration hook, and two post-configuration hooks, the hook determination component 302 can assign an index value of 2 to the first pre-configuration hook that is to be performed, an index value of 1 to the second pre-configuration hook that is to be performed, an index value of 0 to the network address configuration hook, an index value of −1 to the first post-configuration hook that is to be performed, an index value of −2 to the second post-configuration hook that is to be performed, wherein the hooks can be executed in order from the pre-configuration hook associated with the index value of 2 through the post-configuration hook associated with the index value of −2. It is to be appreciated and understood that, in accordance with various embodiments and implementations, depending in part on the characteristics associated with the application, operating system, interface configuration system, and/or hardware or virtualization platform, there can be two pre-configuration hooks or more than or less than two pre-configuration hooks, and/or there can be two post-configuration hooks or more than or less than two post-configuration hooks. In connection with creation of a network address management stack for network address configuration, at a desired time (e.g., during creation of the stack or at another desired time thereafter), the hook determination component 302 can populate the index with the hooks of the group of hooks of the network address management stack, in accordance with the determined ordering (e.g., sequence) of hooks and corresponding index numbers of the index.

Similarly, the hook determination component 302 can assign or associate respective index values, which can range from a smallest index value to a largest index value, to or with respective hooks of a group of hooks of a network address management stack for removal of a network address from an interface. For example, if the group of hooks for removal of a network address from an interface comprises two pre-removal hooks, a network address removal hook, and two post-removal hooks, the hook determination component 302 can assign an index value of 2 to the first pre-removal hook that is to be performed, an index value of 1 to the second pre-removal hook that is to be performed, an index value of 0 to the network address removal hook, an index value of −1 to the first post-removal hook that is to be performed, an index value of −2 to the second post-removal hook that is to be performed, wherein the hooks can be executed in order from the pre-removal hook associated with the index value of 2 through the post-removal hook associated with the index value of −2. It is to be appreciated and understood that, in accordance with various embodiments and implementations, depending in part on the characteristics associated with the application, operating system, interface configuration system, and/or hardware or virtualization platform, there can be two pre-removal hooks or more than or less than two pre-removal hooks, and/or there can be two post-removal hooks or more than or less than two post-removal hooks. In connection with creation of a network address management stack for network address removal from an interface, at a desired time (e.g., during creation of the stack or at another desired time thereafter), the hook determination component 302 can populate the index with the hooks of the group of hooks of the network address management stack, in accordance with the determined ordering (e.g., sequence) of hooks and corresponding index numbers of the index for this network address management stack.

The hooks relating to configuration of a network address on an interface can comprise, for example, a first configuration-related (e.g., pre-configuration) hook (e.g., verification hook) that can be utilized to verify that the interface is in a usable state before configuring the network address on the interface, a second configuration-related (e.g., pre-configuration) hook (e.g., exclusive access hook) that can be utilized to coordinate with other nodes (e.g., nodes 104 and/or 106) of the group of nodes for exclusive access to the network address, a third configuration-related hook (e.g., configuration hook) that can be utilized to configure the network address on the interface, a fourth configuration-related (e.g., post-configuration) hook (e.g., duplicate network address detection hook, with regard to IPv6 only) that can be utilized to facilitate duplicate network address detection, a fifth configuration-related (e.g., post-configuration) hook (e.g., gratuitous address resolution protocol (ARP) hook, with regard to IPv4 only) that can be utilized to facilitate sending messages to the other nodes to notify the other nodes that the interface is associated with the network address, a sixth configuration-related (e.g., post-configuration) hook (e.g., configuration check hook) that can be utilized to determine whether the configuring of the network address on the interface has been performed successfully, a seventh configuration-related (e.g., post-configuration) hook (e.g., notification hook) that can be utilized to facilitate sending a notification message (e.g., to one or more system node network services or another desired entity) that can indicate whether the configuring of the network address on the interface has been performed successfully, and/or another desired configuration-related (e.g., pre-configuration or post-configuration) hook that can be utilized to facilitate configuring a network address on an interface.

The hooks relating to removal of a network address from an interface can comprise, for example, a first removal-related (e.g., pre-removal) hook (e.g., pending removal notification hook) that can be utilized to send a notification message to a service to notify one or more system node network services and/or another desired entity that the network address is being removed from the interface, a second removal-related (e.g., pre-removal) hook (e.g., connection prevention hook) that can be utilized to prevent a connection from being established to the network address (e.g., during the network address removal process), a third removal-related (e.g., pre-removal) hook (e.g., a wait hook) that can enable a waiting period (e.g., waiting period of a defined or finite amount of time, such as 5 seconds, 10 seconds, or other desired amount of time greater or less than 10 seconds) to wait for the one or more system node network services to indicate that the removal of the network address from the interface can proceed and/or to inform (or indicate to) the one or more system node network services that they should stop accepting new network connections on that network address, a fourth removal-related (e.g., pre-removal) hook (e.g., discontinue transmission control protocol (TCP) connection hook) that can be utilized to facilitate (e.g., enable) discontinuation (e.g., dropping) of one or more TCP connections associated with the interface, a fifth removal-related hook (e.g., removal hook) that can be utilized to facilitate the removal of the network address from the interface, a sixth removal-related (e.g., post-removal) hook (e.g., exclusive access release hook) that can be utilized to facilitate release of exclusive access of the interface to the network address, a seventh removal-related (e.g., post-removal) hook (e.g., removal notification hook) that can be utilized to send a notification message to notify the one or more system node network services and/or another desired entity of the removal of the network address from the interface, and/or another desired removal-related (e.g., pre-removal or post-removal) hook that can be utilized to facilitate removing a network address from an interface. With further regard to the system node network services, a system node network service can be service on a node (e.g., 102, 104, or 106) that can perform network-related activities and services (e.g., in contrast to services provided directly to the clients). One or more of the pre-removal hooks can enable the one or more system node network services to notify (e.g., warn) the servers (e.g., server message block (SMB) server, network file system (NFS) server, or other server) associated with the nodes of the pending removal of a network address from an interface to give those servers the opportunity to take a precautionary measure, if desired (e.g., appropriate or suitable), to prevent or mitigate disruption of providing services to clients. In this way, if a client is about to take an action through one of the servers (e.g., write a significant amount of data through a server) and it is known by the server that the network address is about to be removed from the interface, the server can take precautionary action that can mitigate disruption of the connection of the client to the node network and/or prevent or mitigate data loss associated with a client action (e.g., writing data through the server) being performed by the client.

In some embodiments, if it is desired (e.g., wanted, required, or otherwise desired) to add a new piece of functionality that requires an operation before or after configuring a network address on an interface (or before or after removing a network address from an interface), a new hook, which can perform such operation, can be developed (e.g., by a user, such as a developer who can create or develop various parts, including hooks, of the system). The NMC 128a (e.g., the hook determination component 302 of the NMC 128a) can be made aware of this newly developed hook and can insert this newly developed hook at the correct index in the network address management stack (e.g., in the correct or proper position or location in the network address management stack relative to the other hooks of the stack). Given the decoupled nature of the hooks of the disclosed subject matter, this can allow for separation of concerns when developing new hooks. This can mean that new hooks can be less likely to have an impact on pre-existing hooks. In certain embodiments, if the required operation is already implemented by an existing hook (e.g., a hook previously developed by the developer), but the existing hook is not currently configured in the network address management stack (e.g., the pluggable network address management stack), the user (e.g., the developer, or another authorized or suitable user) can extend or enable the hook determination component 302 to configure (e.g., to plug in) this existing hook at the correct index (e.g., correct position) in the network address management stack.

The NMC 128a also can comprise an execution component 308 that can execute one or more groups of hooks of one or more network address management stacks for configuration of one or more network addresses on one or more interfaces, and/or can execute one or more groups of hooks of one or more network address management stacks for removal of one or more network addresses from one or more interfaces. For instance, in response to the NMC 128a receiving (e.g., via the communicator component 304) a request to configure a network address on an interface, at runtime, the execution component 308 can execute the group of hooks, in accordance with the order, to configure the network address on the interface. As part of execution of the group of hooks, the NMC 128a (e.g., via the communicator component 304) can facilitate making a call to the kernel 206 to have the kernel 206 add and/or configure the network address on the interface.

With regard to network address removal, the NMC 128a also can employ the execution component 308 to execute hooks of a group of hooks of the network address management stack for network address removal to facilitate removal of a network address from an interface of the node network 108. For example, in response to the NMC 128a receiving (e.g., via the communicator component 304) a request to remove a network address from an interface of the node network 108, the execution component 308 can execute (e.g., at runtime) the hooks of the group of hooks of the network address management stack, in accordance with the order, to remove the network address from the interface, in accordance with the defined network management criteria. As part of execution of the group of hooks to remove the network address from the interface, the NMC 128a (e.g., via the communicator component 304) can facilitate making a call to the kernel 206 to have the kernel 206 remove (e.g., disassociate) and/or disconfigure the network address from the interface.

In some instances, there may be issues that can arise when attempting to configure a network address on an interface of the group of interfaces. For example, it may turn out that an interface on which a network address configuration is being attempted is unavailable (e.g., offline, down, deactivated, or experiencing operational problems), or it may turn out that a duplicate network address (e.g., the same network address as the network address being configured) is found to exist on the node network 108 already (e.g., exist on another interface of the node network), or there may some other type of issue that can render the configuration of a network address, or attempt to configure the network address, on an interface unsuccessful, improper, or problematic.

In accordance with various embodiments, for a network address configuration path, if a hook of the network address management stack and/or the NMC 128a detects a problem associated with the attempt to configure, or the configuration of, the network address on the interface, the NMC 128a, employing the hooks of network address management stack for network address configuration, can discontinue and/or cancel (e.g., terminate) an attempt to configure a network address on an interface, or can cancel or facilitate canceling a configuration of the network address on the interface. For example, if, during execution of the hooks of the network address management stack for network address configuration (e.g., by the execution component 308) to attempt to configure a network address on an interface, a hook of the stack detects or determines a problem (e.g., the interface is determined to be unavailable) such that the network address is not going to be able to be successfully configured on the interface, the hook and/or the NMC 128a can comprise functionality that can enable the hook and/or the NMC 128a to discontinue and/or cancel the configuration of the network address on the interface and to restore or return the interface and/or the interface configuration system to their previous states prior to the attempt to configure the network address on the interface. The NMC 128a also can generate and send a notification message to the upper layer 202 of the application and/or another entity to notify the application and/or other entity that the configuration of the network address on the interface was not successful, was not able to be completed, and/or was canceled.

As another example, if, during execution of the hooks of the network address management stack for network address configuration (e.g., by the execution component 308) a network address is configured on an interface, a hook (e.g., the duplicate network address detection hook) of the stack detects or determines a problem (e.g., detects a duplicate network address configured on another interface on the node network 108), after configuration of the network address on the interface, such that the hook and/or the NMC 128*a* determines that the network address has to be removed from the interface, the hook and/or the NMC 128*a* can comprise functionality that can enable the hook and/or the NMC 128*a* to discontinue the execution of any remaining hooks of that stack (e.g., the stack for configuration of the network address) and/or cancel the network address configuration process, initiate a removal path to remove (e.g., disconfigure or disassociate) the network address from the interface, and/or restore or return the interface and/or the interface configuration system to their previous states prior to the configuration of the network address on the interface. With regard to the duplicate network address detection hook, when this hook is executed, the hook can monitor the network address across the interface configuration system for a desired amount of time (e.g., five seconds, ten seconds, or other desired amount of time greater than or less than 10 seconds) to determine whether that network address (e.g., duplicate network address) already is configured on any interface. If, based on the monitoring, the hook detects that the network address is a duplicate of a network address already configured on an interface, the hook can indicate that there is a duplicate network address problem, and the hook and/or NMC 128*a* can initiate the removal path (if, instead, no duplicate network address is detected by the hook, the network address configuration process can continue, unless another problem is detected (e.g., by another hook)). As part of the removal path, the hook and/or the NMC 128*a* can initiate the execution of the network address management stack for removal of the network address from the interface. In response to such initiation, the execution component 308 can execute (e.g., execute in order) the hooks of the network address management stack for removal of the network address to remove the network address from the interface. The NMC 128*a* also can generate and send a notification message to the upper layer 202 of the application and/or another entity to notify the application and/or other entity that the configuration of the network address on the interface was not successful, the configuration of the network address on the interface had to be removed due to the problem (e.g., the duplicate network address) being detected.

Figure 4:
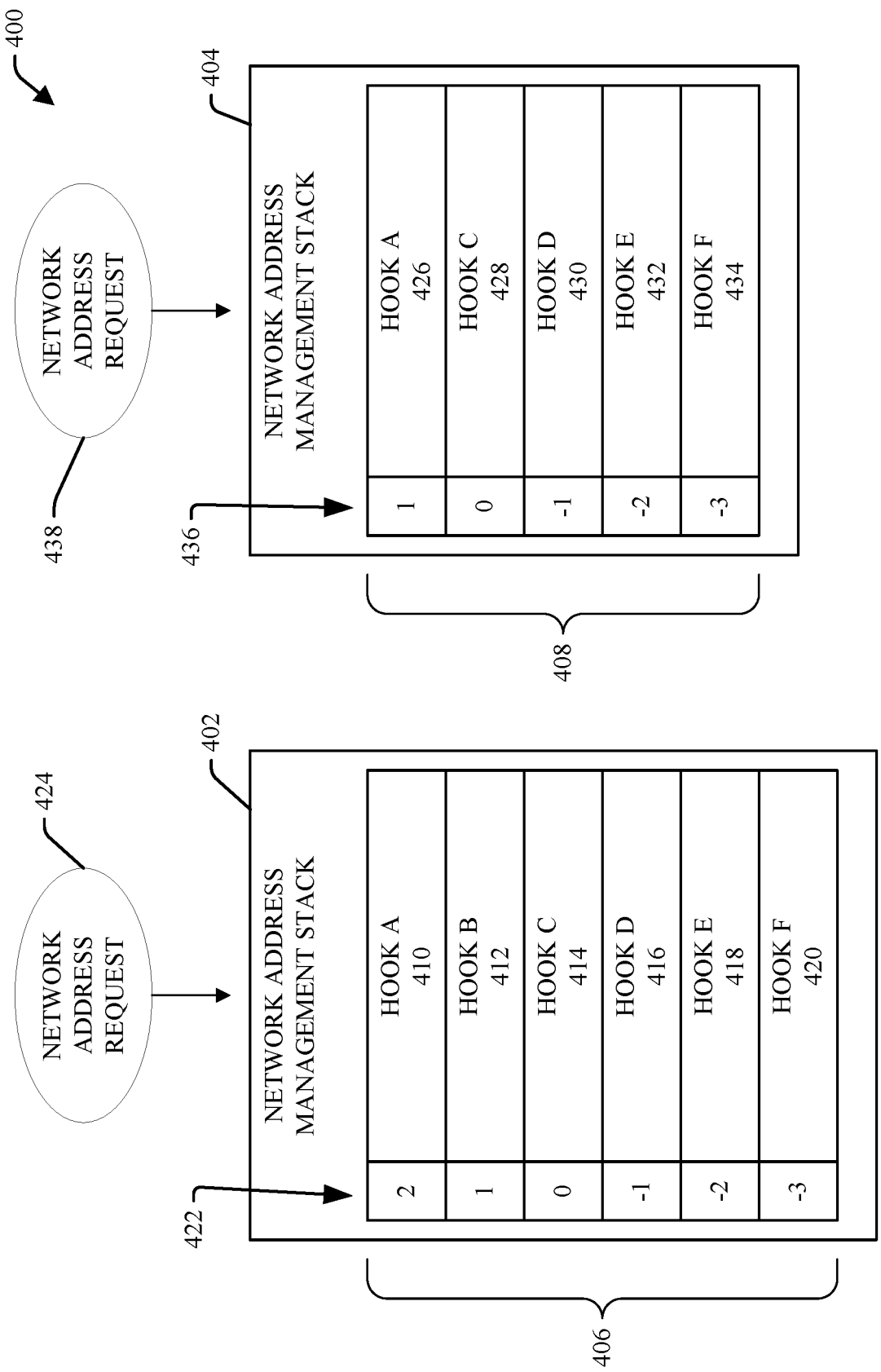
FIG. 4 depicts a block diagram of example network address management stacks for configuration of network addresses on interfaces, in accordance with various aspects and embodiments of the disclosed subject matter.

Turning to FIG. 4 (along with FIGS. 1, 2, and 3), FIG. 4 depicts a block diagram of example network address management stacks 400 for configuration of network addresses on interfaces, in accordance with various aspects and embodiments of the disclosed subject matter. The example network address management stacks 400 can comprise a first network address management stack 402 associated with a first implementation, and a second network address management stack 404 associated with a second implementation.

In a first implementation, the NMC 128*a* (e.g., employing the hook determination component 302) can determine a first group of hooks 406 of the first network address management stack 402 based at least in part on (e.g., to account for) a first group of characteristics associated with an application, an operating system, an interface configuration system, and/or a hardware or virtualization platform, such as described herein. In a second implementation, the NMC 128*a* (e.g., employing the hook determination component 302) can determine a second group of hooks 408 of the second network address management stack 404 based at least in part on a second group of characteristics associated with an application, an operating system, an interface configuration system, and/or a hardware or virtualization platform, such as described herein, wherein such application, operating system, interface configuration system, and/or hardware or virtualization platform associated with the second implementation can be the same as or different from the application, operating system, interface configuration system, and/or hardware or virtualization platform associated with the first implementation, but wherein, in any event, one or more characteristics of the second group of characteristics associated with such application, operating system, interface configuration system, and/or hardware or virtualization platform can be different from the first group of characteristics associated with the first implementation. That is, for example, the application associated with the first implementation may be the same as the application associated with the second implementation, but one or more characteristics (e.g., version of the software or firmware of the application, a configuration or setting of the application, or other type of characteristic) associated with the application utilized in the first implementation can be different than one or more other characteristics (e.g., corresponding characteristics) associated with the application as utilized in the second implementation. As another example, alternatively, the applications of the implementations can be different from each other in that the application associated with the first implementation can be a first application and/or a first type of application, and the application associated with the second implementation can be a second application and/or a second type of application.

The first group of hooks 406 of the first network address management stack 402 can comprise, for example, hook A 410, hook B 412, hook C 414, hook D 416, hook E 418, and hook F 420. The first group of hooks 406 can be associated with a first group of index numbers 422, wherein respective index numbers of the first group of index numbers 422 can be associated with respective hooks of the first group of hooks 406. Hook A 410 can be, for example, a verification hook that can be utilized to verify that the interface (e.g., a first network address) to be configured is in a usable state before configuring the network address on the interface, wherein the verification hook can be a first pre-configuration hook and can be associated with an index number of 2. Hook B 412 can be an exclusive access hook that can be utilized to coordinate with other nodes (e.g., nodes 104 and/or 106) of the group of nodes for exclusive access to the network address that is being configured, wherein the exclusive access hook can be a second pre-configuration hook and can be associated with an index number of 1. Hook C 414 can be a configuration hook that can be utilized to configure the network address on the interface, wherein the configuration hook can be associated with an index number of 0, since it is the configuration hook. Hook D 416 can be a duplicate network address detection hook (e.g., for IPv6 only) that can be utilized to facilitate duplicate network address detection with respect to the network address being configured, wherein the duplicate network address detection hook can be a first post-configuration hook and can be associated with an index number of −1. Hook E 418 can be a gratuitous ARP hook (e.g., for IPv4 only) that can be utilized to facilitate sending messages to the other nodes to notify the other nodes that the interface is associated with the network address, wherein the gratuitous ARP hook can be a second post-configuration hook and can be associated with an index number of −2. Hook F 420 can be a notification hook that can be utilized to facilitate sending a notification message to various components (e.g., nodes or other components of the distributed node network system (e.g., network address orchestration system)) of the system 100 that can indicate the network address has been successfully configured on the interface, wherein the notification hook can be a third post-configuration hook and can be associated with an index number of −3. In connection with creation of the first network address management stack 402, at a desired time (e.g., during creation of the first network address management stack 402 or at another desired time thereafter), the hook determination component 302 can populate the index with the associated hooks of the group of hooks (e.g., hook A 410, hook B 412, hook C 414, hook D 416, hook E 418, and hook F 420) of the stack 402, in accordance with the determined hook order (e.g., sequence) and corresponding index (e.g., first group of index numbers 422).

In response to receiving (e.g., from the application) a first network address request 424 to configure a network address on an interface of the group of interfaces, the execution component 308 can execute the respective hooks (e.g., hook A 410, hook B 412, hook C 414, hook D 416, hook E 418, and hook F 420) of the first network address management stack 402, in accordance with the order (and corresponding index numbers of the first group of index numbers 422). For instance, the execution component 308 can pass or facilitate passing the first network address request 424 to the respective hooks of the first network address management stack 402, in accordance with the order, where, for example, hook A 410 can perform one or more operations in connection with the first network address request 424, and, after hook A 410 has completed its operations, the first network address request 424 can be passed to hook B 412, which can perform one or more operations in connection with the first network address request 424, and so on, until the first network address request 424 has been passed to all of the hooks (e.g., hook A 410, hook B 412, hook C 414, hook D 416, hook E 418, and hook F 420) of the first network address management stack 402 and all of the hooks have performed their respective operations in connection with processing the first network address request 424 and configuring the network address on the interface.

In some embodiments, during the execution of the hooks of a network address management stack (e.g., stack 402), if the network address the NMC 128*a* is attempting to configure is different from the network address family (e.g., is different from the type, version, or format of network address) specified for a particular hook, the particular hook can be a no operation hook (e.g., the hook can perform no operation with regard to the network address configuration request) and can return (e.g., immediately or substantially immediately return), so that the network address request (e.g., the first network address request 424) can be passed to the next hook in the network address management stack. For example, if the network address is an IPv4 address, and if the network address management stack includes a duplicate network address detection hook (e.g., for IPv6 only), during execution of the hooks of the network address management stack, when the duplicate network address detection hook is reached, the duplicate network address detection hook can execute no operation during processing of the network address configuration request, and the network address configuration request can be passed on to the next hook in the network address management stack.

The second group of hooks 408 of the first network address management stack 402 can comprise, for example, hook A 426, hook C 428, hook D 430, hook E 432, and hook F 434. The second group of hooks 408 can be associated with a second group of index numbers 436, wherein respective index numbers of the second group of index numbers 436 can be associated with respective hooks of the second group of hooks 408. Hook A 426 can be, for example, a verification hook that can be utilized to verify that the interface (e.g., a second network address) to be configured is in a usable state before configuring the network address on that interface, wherein the verification hook can be a first pre-configuration hook (in this second implementation, it is the only pre-configuration hook) and can be associated with an index number of 1. Hook C 428 can be a configuration hook that can be utilized to configure the network address on that interface, wherein the configuration hook can be associated with an index number of 0, since it is the configuration hook. Hook D 430 can be a duplicate network address detection hook (e.g., for IPv6 only) that can be utilized to facilitate duplicate network address detection with respect to the network address being configured, wherein the duplicate network address detection hook can be a first post-configuration hook and can be associated with an index number of −1. Hook E 432 can be a gratuitous ARP hook (e.g., for IPv4 only) that can be utilized to facilitate sending messages to the other nodes to notify the other nodes that the interface is associated with the network address, wherein the gratuitous ARP hook can be a second post-configuration hook and can be associated with an index number of −2. Hook F 434 can be a notification hook that can be utilized to facilitate sending a notification message to various components (e.g., nodes or other components of the network address orchestration system) that can indicate the network address has been successfully configured on the interface, wherein the notification hook can be a third post-configuration hook and can be associated with an index number of −3. In connection with creation of the second network address management stack 404, at a desired time (e.g., during creation of the second network address management stack 404 or at another desired time thereafter), the hook determination component 302 can populate the index with the associated hooks of the group of hooks (e.g., hook A 426, hook C 428, hook D 430, hook E 432, and hook F 434) of the stack 404, in accordance with the determined hook order (e.g., sequence) and corresponding index (e.g., second group of index numbers 436).

In response to receiving (e.g., from the application) a second network address request 438 to configure a second network address on an interface of the group of interfaces, the execution component 308 can execute the respective hooks (e.g., hook A 426, hook C 428, hook D 430, hook E 432, and hook F 434) of the second network address management stack 404, in accordance with the order (and corresponding index numbers of the second group of index numbers 436). For example, the execution component 308 can pass or facilitate passing the second network address request 438 to the respective hooks of the second network address management stack 404, in accordance with the order, where, for example, hook A 426 can perform one or more operations in connection with the second network address request 438, and, after hook A 426 has completed its operations, the second network address request 438 can be passed to hook B 428, which can perform one or more operations in connection with the second network address request 438, and so on, until the second network address request 438 has been passed to all of the hooks (e.g., hook A 426, hook C 428, hook D 430, hook E 432, and hook F 434) of the second network address management stack 404 and all of the hooks have performed their respective operations in connection with processing the second network address request 438 and configuring that network address on that interface.

Hook A 410 and hook A 426 can be the same type of hook (e.g., verification hook) and can perform same or similar operations, but can be executed independently of each other with regard to the respective network address requests (e.g., the first network address request 424 and the second network address request 438). Hook C 414 and hook C 428 can be the same type of hook (e.g., configuration hook) and can perform same or similar operations, but can be executed independently of each other with regard to the respective network address requests (e.g., the first network address request 424 and the second network address request 438). Hook D 416 and hook D 430 can be the same type of hook and can perform same or similar operations, but can be executed independently of each other with regard to the respective network address requests (e.g., the first network address request 424 and the second network address request 438). Hook E 418 and hook E 432 can be the same type of hook and can perform same or similar operations, but can be executed independently of each other with regard to the respective network address requests (e.g., the first network address request 424 and the second network address request 438). Hook F 420 and hook F 434 can be the same type of hook and can perform same or similar operations, but can be executed independently of each other with regard to the respective network address requests (e.g., the first network address request 424 and the second network address request 438).

As also can be observed, a difference between the first network address management stack 402 and the second network address management stack 404 can comprise that the first group of hooks 406 associated with the first network address management stack 402 can include hook B 412, which can be an exclusive access hook that can be utilized to coordinate with other nodes of the group of nodes for exclusive access to the first network address that is being configured, whereas, the second group of hooks 408 associated with the second network address management stack 404 does not include an exclusive access hook, due in part to the difference between the first group of characteristics and the second group of characteristics. For example, with regard to the second implementation, based at least in part on an analysis of second information relating to the application, the operating system, the interface configuration system, and/or the hardware or virtualization platform of the second implementation, the NMC 128a (e.g., the characteristics component 306) can determine that the application, the operating system, the interface configuration system, or the hardware or virtualization platform of the second implementation already has a component or subsystem that can run (e.g., execute) code that can coordinate exclusive access or ownership of a network address (e.g., the second network address) before the execution component 308 configures the network address on an interface. As a result of such analysis and such characteristics of the second group of characteristics, the hook determination component 302 can determine that an exclusive access hook does not have to be included in (e.g., does not have to be plugged in to) the second group of hooks 408 of the second network address management stack 404, and accordingly, the hook determination component 302 does not include the exclusive access hook in the second group of hooks 408, in accordance with the defined network management criteria.

In contrast, with regard to the first implementation, based at least in part on an analysis of first information relating to the application, the operating system, the interface configuration system, and/or the hardware or virtualization platform of the first implementation, the NMC 128a (e.g., the characteristics component 306) can determine that the application, the operating system, the interface configuration system, or the hardware or virtualization platform of the first implementation does not have a component or subsystem that can run code that can coordinate exclusive access or ownership of a network address (e.g., the first network address) before the execution component 308 configures the network address on an interface. As a result of such analysis and such characteristics of the first group of characteristics, the hook determination component 302 can determine that an exclusive access hook is to be included in (e.g., is to be plugged in to) the first group of hooks 406 of the first network address management stack 402, and accordingly, the hook determination component 302 can include the exclusive access hook (e.g., hook B 412) in the first group of hooks 406, in accordance with the defined network management criteria.

It is to be appreciated and understood that, the first network address management stack 402 and the second network address management stack 404 are example network address management stacks with example differences in their respective hooks. In other implementations and embodiments, depending in part on the characteristics associated with an application, operating system, interface configuration system, and/or hardware or virtual platform associated with another implementation, the NMC 128a can determine another network address management stack that can comprise another (e.g., a different) group of hooks where one or more hooks of the other group of hooks can be different from the respective hooks of the first group of hooks 406 and second group of hooks 408, the number of hooks of the other group of hooks can be different from the respective numbers of hooks of the first group of hooks 406 and second group of hooks 408, and/or the ordering of hooks of the other group of hooks can be different from the respective orderings of hooks of the first group of hooks 406 and second group of hooks 408.

It also it to be appreciated and understood that, while, in some embodiments, hooks of a group of hooks (e.g., 406) can be in a specific order, in other embodiments, the NMC 128a can place hooks in a network address management stack based at least in part on whether a hook is a pre-configuration hook, a configuration hook, or a post-configuration hook, or whether a hook is a pre-remove hook, a removal hook, or a post-removal hook. For example, the NMC 128a (e.g., hook determination component 302 of the NMC 128a) can order the hooks of a network address management stack for network address configuration based at least in part on whether a hook is a pre-configuration hook, a configuration hook, or a post-configuration hook, wherein one or more pre-configuration hooks can be placed in any available slots (e.g., in any desired order in relation to each other) in the stack before the configuration hook, and one or more post-configuration hooks can be placed in any available slots (e.g., in any desired order in relation to each other) in the stack after the configuration hook, unless a particular pre-configuration hook is dependent on another pre-configuration hook performing its operation(s) before the particular pre-configuration hook is executed, or unless a particular post-configuration hook is dependent on another post-configuration hook performing its operation(s) before the particular post-configuration hook is executed. If a particular pre-configuration hook (or particular post-configuration hook) is dependent on another pre-configuration hook (or another post-configuration hook), the hook determination component 302 can place the particular pre-configuration hook (or the particular post-configuration hook) after the other pre-configuration hook (or the other post-configuration hook) in the ordering of the network address management stack. The hook determination component 302 can similarly order hooks of a network address management stack for network address removal based at least in part on whether a hook is a pre-removal hook, a removal hook, or a post-removal hook, and can take into account any dependency (if any) between two hooks.

Figure 5:
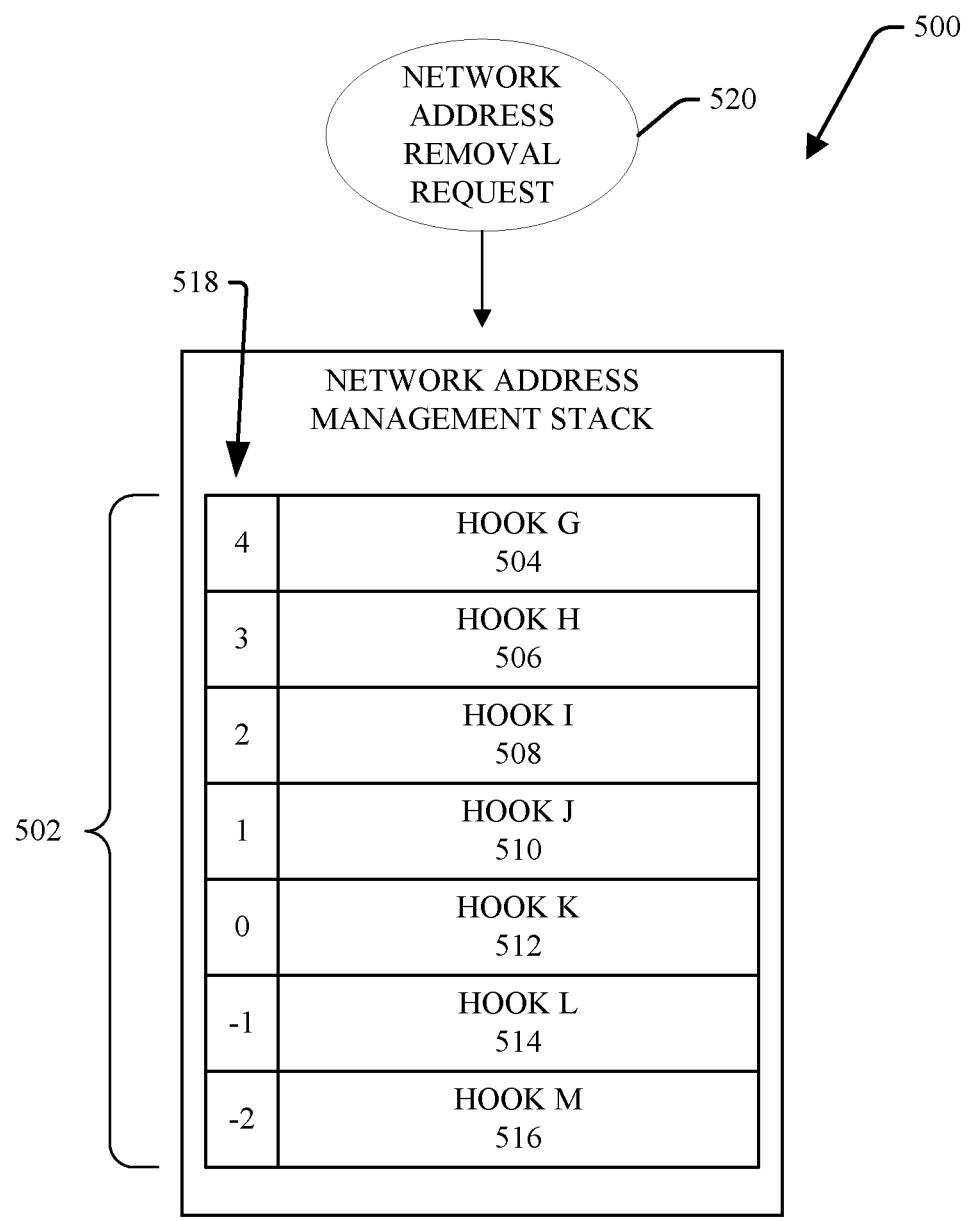
FIG. 5 presents a block diagram of an example network address management stack for removal of a network address from an interface, in accordance with various aspects and embodiments of the disclosed subject matter.

Referring to FIG. 5 (along with FIGS. 1, 2, and 3), FIG. 5 presents a block diagram of an example network address management stack 500 for removal of a network address from an interface, in accordance with various aspects and embodiments of the disclosed subject matter. In an example implementation, the NMC 128a (e.g., employing the hook determination component 302) can determine a group of hooks 502 of the network address management stack 500 based at least in part on (e.g., to account for) a group of characteristics associated with an application, an operating system, an interface configuration system, and/or a hardware or virtualization platform of the example implementation, such as described herein.

The group of hooks 502 of the network address management stack 500 can comprise, for example, hook G 504, hook H 506, hook I 508, hook J 510, hook K 512, hook L 514, and hook M 516. The group of hooks 502 can be associated with a group of index numbers 518, wherein respective index numbers of the group of index numbers 518 can be associated with respective hooks of the group of hooks 502. Hook G 504 can be, for example, a pending (or initiation of) removal notification hook that can be utilized to send a notification message to one or more system node network services to notify the one or more system node network services that the network address is being removed from the interface, wherein the pending (or initiation of) removal notification hook can be a first pre-removal hook and can be associated with an index number of 4 (e.g., since there can be four pre-removal hooks in the group of hooks 502). Hook H 506 can be a connection prevention hook that can be utilized to prevent a connection from being established to the network address (e.g., during the network address removal process), wherein the connection prevention hook can be a second pre-removal hook and can be associated with an index number of 3. Hook I 508 can be a wait hook that can enable a waiting period to wait for the one or more system node network services to indicate that the removal of the network address from the interface can proceed, wherein the wait hook can be a third pre-removal hook and can be associated with an index number of 2. Hook J 510 can be a discontinue TCP connection hook that can be utilized to facilitate (e.g., enable) discontinuation (e.g., dropping) of one or more TCP connections associated with the interface, wherein the discontinue TCP connection hook can be a fourth pre-removal hook and can be associated with an index number of 1. Hook K 512 can be a removal hook that can be utilized to facilitate the removal of the network address from the interface, wherein the removal hook can be associated with an index number of 0, since it is the removal hook. Hook L 514 can be an exclusive access release hook that can be utilized to facilitate release of exclusive access of the interface to the network address, wherein the exclusive access release hook can be a first post-removal hook and can be associated with an index number of −1, since it is a first post-removal hook. Hook M 516 can be a removal notification hook that can be utilized to send a notification message to notify the one or more system node network services of the removal of the network address from the interface, wherein the removal notification hook can be a second post-removal hook and can be associated with an index number of −2. In connection with creation of the network address management stack 500, at a desired time (e.g., during creation of the network address management stack 500 or at another desired time thereafter), the hook determination component 302 can populate the index with the associated hooks of the group of hooks (e.g., hook G 504, hook H 506, hook I 508, hook J 510, hook K 512, hook L 514, and hook M 516) of the stack 500, in accordance with the determined hook order (e.g., sequence) and corresponding index (e.g., group of index numbers 518).

In response to receiving (e.g., from the application) a network address removal request 520 to request removal of a network address from an interface of the group of interfaces, or in response to determining that a network address is otherwise to be removed from the interface (e.g., due to a problem associated with the configuration of the network address on the interface, such as described herein), the execution component 308 can execute the respective hooks (e.g., hook G 504, hook H 506, hook I 508, hook J 510, hook K 512, hook L 514, and hook M 516) of the network address management stack 500, in accordance with the order (and corresponding index numbers of the group of index numbers 518). For example, the execution component 308 can pass or facilitate passing the network address removal request 520 to the respective hooks of the network address management stack 500, in accordance with the order, where, for example, hook G 504 can perform one or more operations in connection with the network address removal request 520, and, after hook G 504 has completed its operations, the network address removal request 520 can be passed to hook H 506, which can perform one or more operations in connection with the network address removal request 520, and so on, until the network address removal request 520 has been passed to all of the hooks (e.g., hook G 504, hook H 506, hook I 508, hook J 510, hook K 512, hook L 514, and hook M 516) of the network address management stack 500 and all of the hooks have performed their respective operations in connection with processing the network address request 500 and removing the network address from the interface.

It is to be appreciated and understood that, the network address management stack 500 is an example network address management stack that can be utilized, in connection with that example implementation, to remove a network address from an interface. In other implementations and embodiments, depending in part on the characteristics associated with an application, operating system, interface configuration system, and/or hardware or virtual platform associated with another implementation, the NMC 128a can determine another network address management stack that can comprise another (e.g., a different) group of hooks that can be utilized to remove a network address from an interface where one or more hooks of this other group of hooks can be different from the hooks of the group of hooks 502, the number of hooks of the other group of hooks can be different from the number of hooks of the group of hooks 502, and/or the ordering of hooks of the other group of hooks can be different from the ordering of hooks of the group of hooks 502.

Figure 6:
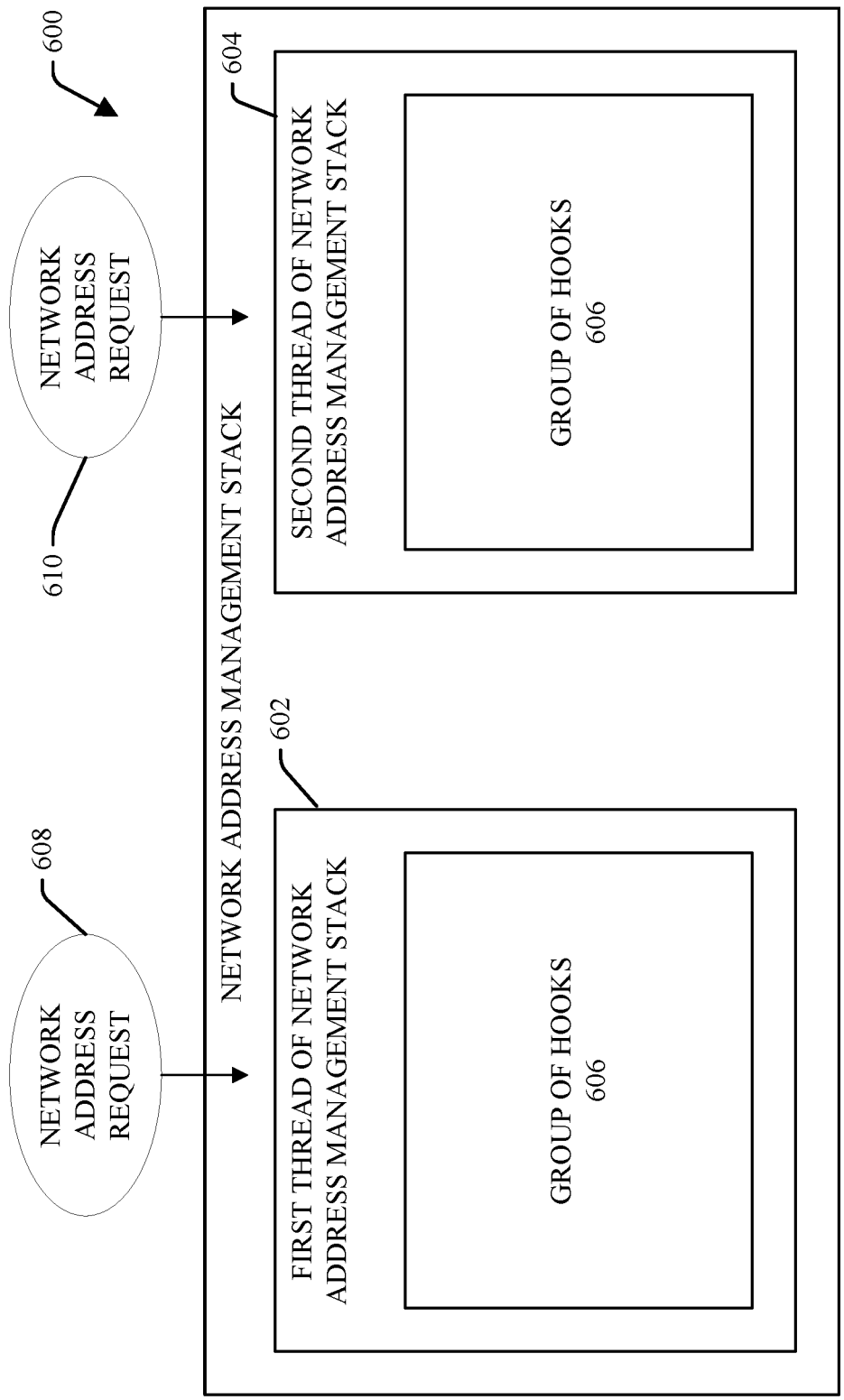
FIG. 6 illustrates a block diagram of example threads of a network address management stack that can be utilized to configure (or remove) respective network addresses on (or from) respective interfaces (e.g., in parallel; or concurrently), in accordance with various aspects and embodiments of the disclosed subject matter.

Turning briefly to FIG. 6 (along with FIGS. 1, 2, and 3), FIG. 6 illustrates a block diagram of example threads (e.g., processing threads) of a network address management stack 600 that can be utilized to configure (or remove) respective network addresses on (or from) respective interfaces (e.g., in parallel; or concurrently), in accordance with various aspects and embodiments of the disclosed subject matter. For instance, if a network address request(s) is received by the NMC 128a (e.g., via the communicator component 304), where the network address request(s) requests configuration of a multiple network addresses on multiple interfaces of the group of interfaces, the NMC 128a can utilize (e.g., execute) respective threads of the network address management stack 600 to configure respective network addresses of the network address request(s) on respective interfaces. For example, if the request(s) comprises requests to configure network addresses, including a first network address (e.g., 608) on a first interface of the group of interfaces and a second network address (e.g., 610) on a second interface of the group of interfaces, the NMC 128a can execute a first thread of the network address management stack 602 to configure the first network address (e.g., 608) on the first interface, and execute a second thread of the network address management stack 604 to configure the second network address (e.g., 610) on the second interface. In some embodiments, the first thread of the network address management stack 602 and the second thread of the network address management stack 604 can each comprise the same group of hooks (e.g., group of hooks 606) in the same order.

In some embodiments, the execution component 308 can execute the hooks of the first thread of the network address management stack 602 in order to perform the configuration of the first network address on the first interface, and can execute the hooks of the second thread of the network address management stack 604 in order to perform the configuration of the second network address on the second interface. In certain embodiments, if desired, the execution component 308 can execute the hooks of the first thread of the network address management stack 602 in parallel, or concurrently, with the executing of the hooks of the second thread of the network address management stack 604.

That is, network address requests can be executed in parallel using the network address management stack, where each network address to be configured on an interface can pass through the network address management stack (e.g., the respective threads of the network address management stack) such that the network addresses are not serialized by the operations performed on another network address that also is traversing the network address management stack. This can mean that, for example, if the first network address starts traversing the first thread of the network address management stack 602 before the second network address begins to traverse the second thread of the network address management stack 604, but the first network address runs into a block or a relatively long wait time (e.g., a block or relatively long wait time that can be associated with an operation of a hook (e.g., a wait hook or other hook), can be associated with the hook communicating with a remote system or other component, or can be for any other reason) during the traversing of the first thread of the network address management stack 602, the second network address can continue to traverse the second thread of the network address management stack 604 (e.g., the execution component 308 can continue to execute the hooks of the second thread of the network address management stack 604) and can be configured on the second interface (e.g., before the first network address is configured on the first interface).

That is, it is not necessary for the execution component 308 to execute all (or even any) of the hooks of the first thread of the network address management stack 602 before executing any (or all) of the hooks of the second thread of the network address management stack 604.

In this way, the NMC 128a can desirably (e.g., suitably, efficiently, enhancedly, or optimally) configure respective network addresses on respective interfaces at the same or substantially same time, which can reduce the amount of time utilized to configure multiple network addresses on multiple interfaces. Also, since the NMC 128a can desirably configure respective network addresses on respective interfaces in parallel, or concurrently, if a thread (e.g., first thread) of the network address management stack (e.g., 602) is blocked (e.g., temporarily or permanently blocked) from performing an operation (e.g., executing an operation of a particular hook), such block does not impede the progress of any of the other threads (e.g., second thread) of the network address management stack (e.g., 604), and the execution component 308 can continue to execute the hooks of the other thread(s) (e.g., second thread) of the network address management stack (e.g., 604) to configure the other network address(es) (e.g., second network address) on the other interface(s) (e.g., second interface). This also can desirably (e.g., suitably, efficiently, enhancedly, or optimally) reduce the amount of time utilized to configure multiple network addresses on multiple interfaces.

Similarly, the NMC 128a can utilize (e.g., execute) respective threads of a network address management stack to remove respective network addresses of from respective interfaces (e.g., in parallel, or concurrently), in response to a request(s) to remove network addresses or if the NMC 128a otherwise determines that the respective network addresses are to be removed from the respective interfaces. The execution component 308 can execute (e.g., in parallel, or concurrently) the hooks of the respective threads of a network address management stack to desirably remove (e.g., suitably, efficiently, enhancedly, or optimally) the respective network addresses from the respective interfaces. Also, similarly, the respective threads of the network address management stack can be traversed independently such that a block associated with one of the threads of the network address management stack will not prevent the execution component 308 from continuing to perform operations (e.g., execute hooks) to traverse the other threads of the network address management stack. Such features of the disclosed subject matter can desirably (e.g., suitably, efficiently, enhancedly, or optimally) reduce the amount of time utilized to remove multiple network addresses from multiple interfaces.

It is to be appreciated and understood that, while two threads of a network address management stack are depicted in the example threads of the network address management stack 600 of FIG. 6, in some embodiments, the NMC 128a can utilize and execute a desired number (e.g., three, four, five, or more) threads of a network address management stack (e.g., in parallel or concurrently, to the extent that resources are available execute such threads in parallel or concurrently). It also is to be appreciated and understood that, while FIG. 6 depicts respective threads of the network address management stack 600 (e.g., the first thread of the network address management stack 602 and the second thread of the network address management stack 604), in other embodiments, the NMC 128a can utilize (e.g., execute) respective instances of a network address management stack (e.g., a first instance of a network address management stack and a second instance of the network address management stack) to configure (or remove) respective network addresses (e.g., first network address and second network address) on (or from) respective interfaces (e.g., first interface and second interface).

In certain embodiments, based at least in part on (e.g., depending in part on) the configuration of the application, operating system, interface configuration system, or hardware or virtualization platform, and/or based at least in part on what entity or entities (e.g., other systems, subsystems, devices, or components) the node network is connected to, the NMC 128a can generate and utilize multiple different network address management stacks (e.g., first network address management stack, second network address management stack, and/or another network address management stack), comprising different groups of hooks, for configuration of network addresses on interfaces and/or multiple different network address management stacks, comprising different groups of hooks, for removal of network addresses from interfaces, for the same application. For instance, due in part to differences in the behavior desired (e.g., wanted, needed, or required) for different connected networks, the NMC 128a can generate and utilize the different network address management stacks for network address configuration and/or the different network address management stacks for network address removal, where with regard to network address configuration, for example, it can be desired that different network address requests (e.g., respectively associated with different connected networks) traverse and be processed using different network address management stacks for network address configuration.

Figure 7:
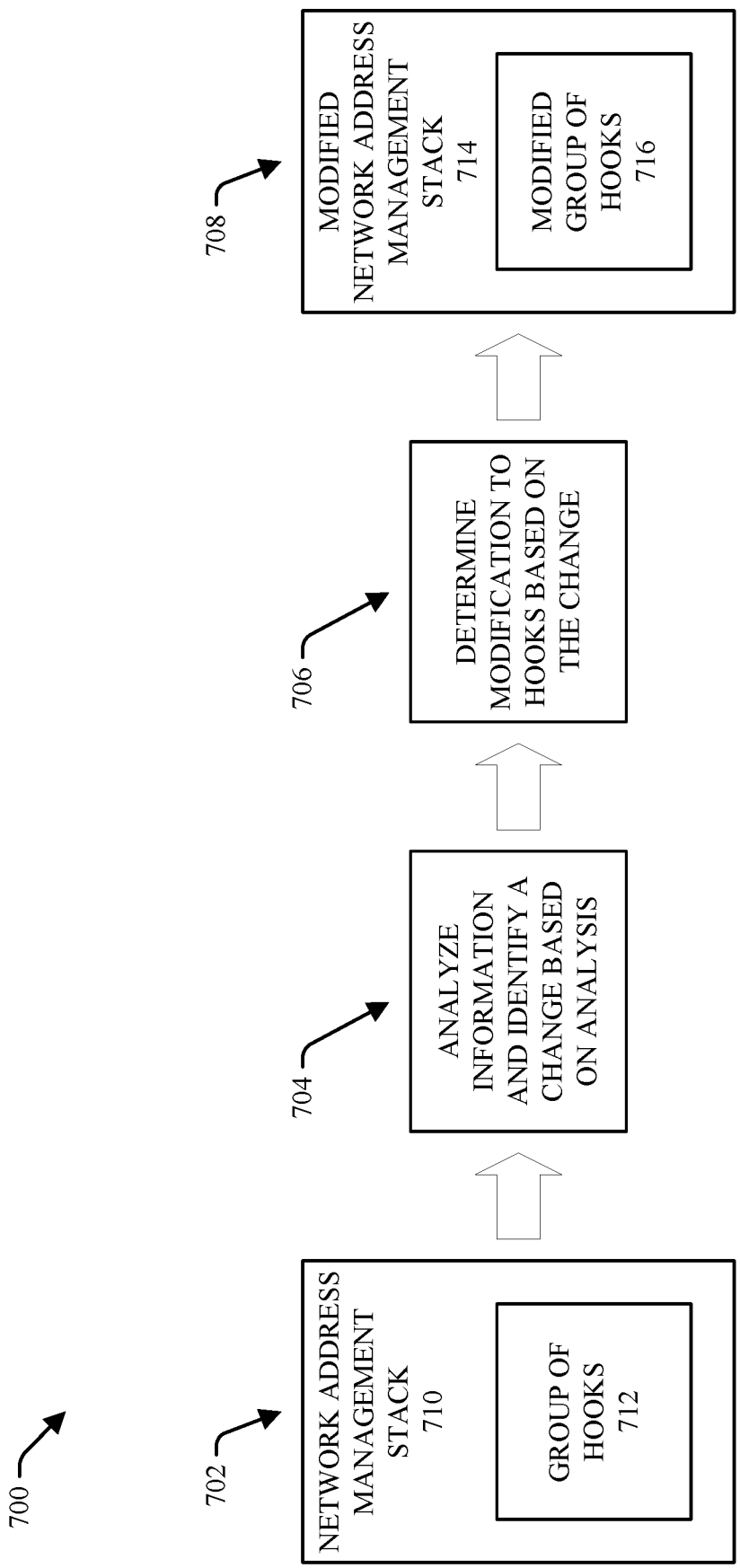
FIG. 7 depicts a block diagram of an example network address management stack modification flow that can be performed to modify a network address management stack, in accordance with various aspects and embodiments of the disclosed subject matter.

Referring to FIG. 7 (along with FIGS. 1, 2, and 3), FIG. 7 depicts a block diagram of an example network address management stack modification flow 700 that can be performed to modify a network address management stack, in accordance with various aspects and embodiments of the disclosed subject matter. As indicated at reference numeral 702 of the example network address management stack modification flow 700, the NMC 128a (e.g., the hook determination component 302) can determine and generate (e.g., create) a network address management stack 710 that can comprise a group of hooks 712 that can be utilized to configure a network address on an interface of the group of interfaces associated with the group of nodes (e.g., 102, 104, and/or 106), based at least in part on characteristics associated with the application, the operating system, the interface configuration system, and/or the hardware or virtual platform, such as described herein.

As indicated at reference numeral 704 of the example network address management stack modification flow 700, the NMC 128a can receive and analyze information relating to a change with regard to the application, the operating system, the interface configuration system, and/or the hardware or virtual platform, and based at least in part on the results of such analysis, the NMC 128a (e.g., the hook determination component 302) can identify (e.g., determine or detect) the change with regard to the application, the operating system, the interface configuration system, and/or the hardware or virtual platform. The change can comprise or relate to a change (e.g., update) in the version of the software or firmware of the application, a change in the configuration of the application, a change in functionality of the application, or other type of change associated with the application; a change (e.g., update) in the version of the software or firmware of the operating system, a change in the configuration of the operating system, a change in functionality of the operating system, or other type of change associated with the operating system; a change in the configuration of the interface configuration system, a change in functionality of the interface configuration system, or other type of change associated with the interface configuration system; and/or a change in the configuration of the hardware or virtual platform, a change in functionality of the hardware or virtual platform, or other type of change associated with the hardware or virtual platform.

As indicated at reference numeral 706 of the example network address management stack modification flow 700, the NMC 128a (e.g., the hook determination component 302) can determine a modification that can be made to the group of hooks 712 of the network address management stack 710 to account for the change to (e.g., change in characteristics associated with) the application, the operating system, the interface configuration system, and/or the hardware or virtual platform. For instance, the NMC 128a can determine the modification that can be made to the group of hooks 712 of the network address management stack 710 based at least in part on the current characteristics, including the change in characteristics, associated with the application, the operating system, the interface configuration system, and/or the hardware or virtual platform. Depending on what the change is, the modification can comprise adding (e.g., plugging in) one or more hooks to the network address management stack 710, removing (e.g., unplugging) one or more hooks from the network address management stack 710, replacing one or more hooks in the network address management stack 710 with one or more other hooks, rearranging the order of execution of the hooks of the network address management stack 710, and/or another desired type of modification to the network address management stack 710 to account for the change to the application, the operating system, the interface configuration system, and/or the hardware or virtual platform.

As indicated at reference numeral 708 of the example network address management stack modification flow 700, the NMC 128a (e.g., the hook determination component 302) can determine and generate a modified network address management stack 714 that can comprise a modified group of hooks 716, based at least in part on the modification, in accordance with the defined network management criteria. The NMC 128a can store information relating to the modified network address management stack 714 in a data store of or associated with the node 102. During subsequent network address configurations, the NMC 128a (or NMC 128b or NMC 128c) can utilize the modified network address management stack 714, including the modified group of hooks 716, to facilitate configuring network addresses on interfaces. If, for example, the modification is to add a new hook to the network address management stack 710 (e.g., add the new hook either before or after configuration of the network address on the interface), where no modification of the current hooks of the network address management stack 710 is to be performed, the NMC 128a can insert the new hook at the correct place (e.g., at the correct index value) in the order (e.g., new or modified order) of hooks, relative to the placements of the other hooks in the order, in the modified network address management stack 714.

In some embodiments, in a similar manner, the NMC 128a can perform the example network address management stack modification flow 700 to determine a modification for, and to modify, based at least in part on the modification, a network address management stack, comprising a group of hooks, utilized for network address removal from an interface to generate a modified network address management stack, comprising a modified group of hooks, that can be utilized for network address removal from an interface, wherein the NMC 128a can determine the modification based at least in part on (e.g., in response to) a change determined to have occurred with regard to the application, the operating system, the interface configuration system, and/or the hardware or virtual platform. As an example, if the modification is to add a new hook to the network address management stack (e.g., add the new hook either before or after removal of the network address from the interface), where no modification of the current hooks of the network address management stack for network address removal is to be performed, the NMC 128a can insert the new hook at the correct place (e.g., at the correct index value) in the order (e.g., new or modified order) of hooks, relative to the placements of the other hooks in the order, in the modified network address management for removal of a network address from an interface.

The NMCs 128a, 128b, and 128c of the system 100 of FIG. 1 can coordinate and synchronize with each other, and can exchange information with each other, to facilitate identifying (e.g., determining) or notifying regarding which network addresses have been configured or are being configured on which interfaces of the group of interfaces, identifying which network addresses are available, identifying which interfaces of the group of interfaces are available, identifying or notifying regarding which network addresses have been or are being removed from which interfaces, identifying or notifying regarding which hooks are to be included in a group of hooks of a network address management stack, identifying or notifying regarding an order of hooks of a group of hooks of a network address management stack, identifying or notifying regarding a modification to a network address management stack, identifying operational statuses of nodes (e.g., 102, 104, and/or 106) and associated services, managing connections of clients to interfaces and associated nodes, and/or exchanging other desired information.

With further regard to the NMC 128a of FIG. 3, in certain embodiments, the NMC 128a can employ an operations manager component 310 that can facilitate generating instructions to have components of the NMC 128a perform operations, and can communicate respective instructions to respective components (e.g., hook determination component 302, communicator component 304, characteristics component 306, execution component 308, processor component 312, data store 314, or other component) of the NMC 128a to facilitate performance of operations by the respective components of the NMC 128a based at least in part on the instructions, in accordance with the defined network management criteria and network management algorithm(s) (e.g., network management algorithms as disclosed, defined, recited, or indicated herein by the methods, systems, and techniques described herein). The operations manager component 310 also can facilitate controlling data flow between the respective components of the NMC 128a and controlling data flow between the NMC 128a and another component(s) or device(s) (e.g., node, service server, communication device, network device, memory, file system, or other component or device) associated with (e.g., connected to) the NMC 128a.

The processor component 312 can work in conjunction with the other components (e.g., hook determination component 302, communicator component 304, characteristics component 306, execution component 308, operations manager component 310, and data store 314) to facilitate performing the various functions of the NMC 128a. The processor component 312 can employ one or more processors, microprocessors, or controllers that can process data, such as information relating to nodes, network of nodes, service servers, communication devices, network addresses, interface identifiers, node identifiers, network address requests (e.g., network address configuration requests, or network address removal requests), hooks, network address management stacks, applications, operating systems, interface configuration systems, hardware or virtual platforms, characteristics associated with applications, operating systems, interface configuration systems, or hardware or virtual platforms, preferences (e.g., user preferences), services, files, file systems, hash values, metadata, parameters, traffic flows, policies, defined network management criteria, algorithms (e.g., network management algorithms, hash algorithms, data compression algorithms, data decompression algorithms, and/or other algorithm), protocols, interfaces, tools, and/or other information, to facilitate operation of the NMC 128a, as more fully disclosed herein, and control data flow between the NMC 128a and other components (e.g., node, service server, communication device, network device, memory, file system, or other component or device) associated with the NMC 128a.

The data store 314 can store data structures (e.g., user data, metadata), code structure(s) (e.g., modules, objects, hashes, classes, procedures) or instructions, information relating to nodes, network of nodes, service servers, communication devices, network addresses, interface identifiers, node identifiers, network address requests (e.g., network address configuration requests, or network address removal requests), hooks, network address management stacks, applications, operating systems, interface configuration systems, hardware or virtual platforms, characteristics associated with applications, operating systems, interface configuration systems, or hardware or virtual platforms, preferences (e.g., user preferences), services, files, file systems, hash values, metadata, parameters, traffic flows, policies, defined network management criteria, algorithms (e.g., network management algorithms, hash algorithms, data compression algorithms, data decompression algorithms, and/or other algorithm), protocols, interfaces, tools, and/or other information, to facilitate controlling operations associated with the NMC 128a. In an aspect, the processor component 312 can be functionally coupled (e.g., through a memory bus) to the data store 314 in order to store and retrieve information desired to operate and/or confer functionality, at least in part, to the hook determination component 302, communicator component 304, characteristics component 306, execution component 308, operations manager component 310, data store 314, or other component, and/or substantially any other operational aspects of the NMC 128a.

Figure 8:
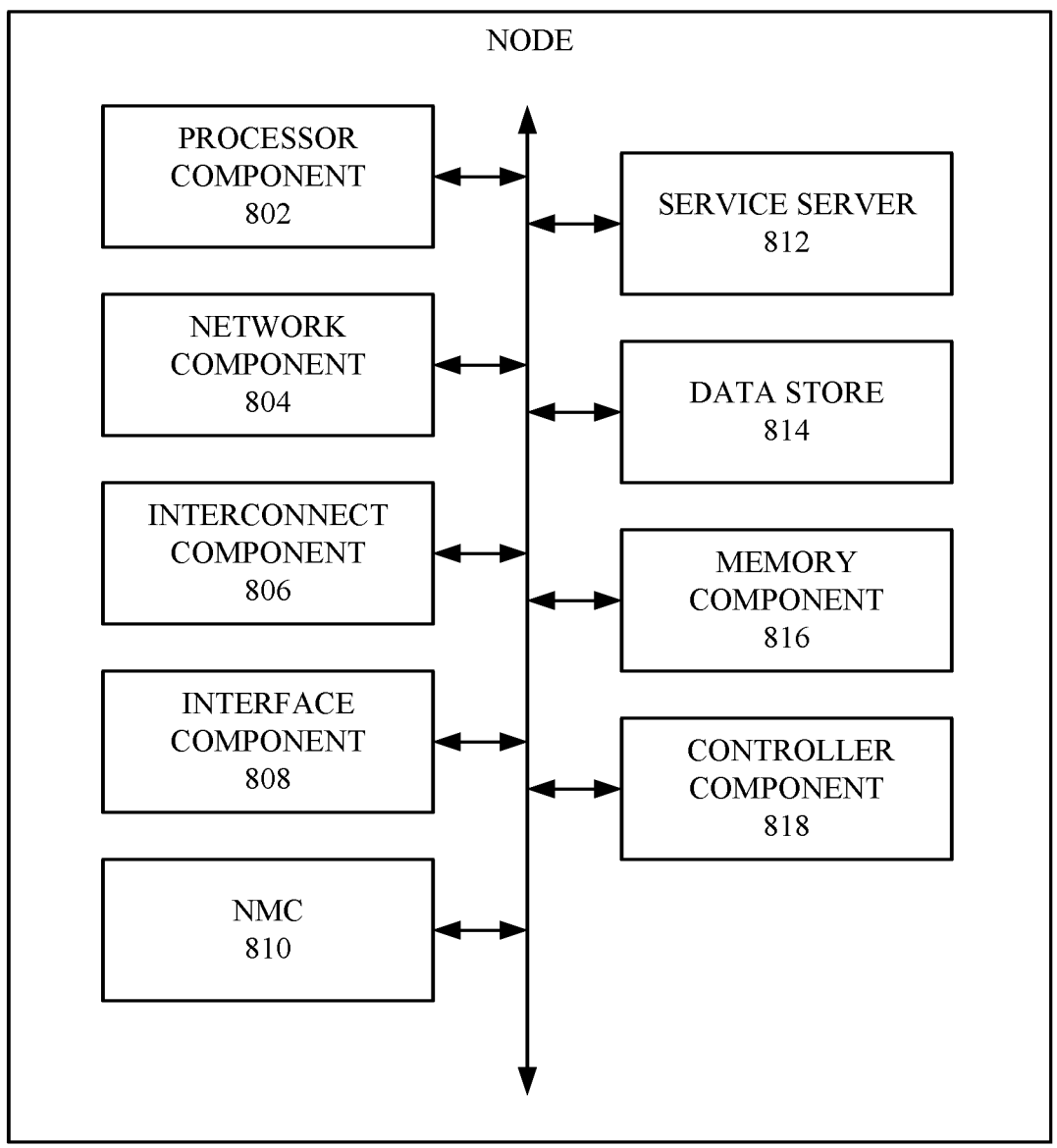
FIG. 8 depicts a block diagram of another example node, in accordance with various aspects and embodiments of the disclosed subject.

FIG. 8 depicts a block diagram of another example node 800, in accordance with various aspects and embodiments of the disclosed subject matter. The node 800 can be employed to store data, manage data, service client requests of clients, provide and perform services (e.g., in response to client requests), and/or perform other desired operations on data, such as described herein. The node 800 can comprise various components, including a processor component 802, a network component 804, an interconnect component 806, an interface component 808, an NMC 810, a service server 812, a data store 814, a memory component 816, a controller component 818, and/or other desired components. The node 800 also can comprise the application, including the upper application layer, middleware, kernel, and hardware component, such as described herein (e.g., in connection with the node 102, and as shown in FIG. 2).

The processor component 802 can include can work in conjunction with the other components (e.g., network component 804, interconnect component 806, interface component 808, NMC 810, service server 812, data store 814, memory component 816, controller component 818, and/or another component) to facilitate performing the various functions of the node 800. The processor component 802 can employ one or more processors (e.g., one or more CPUs), microprocessors, or controllers that can process data, such as information relating to files, file systems, communication connection operations, read operations, write operations, data storage operations, data or file search operations, nodes, network of nodes, service servers, communication devices, network addresses, interface identifiers, node identifiers, network address requests (e.g., network address configuration requests, or network address removal requests), hooks, network address management stacks, applications, operating systems, interface configuration systems, hardware or virtual platforms, characteristics associated with applications, operating systems, interface configuration systems, or hardware or virtual platforms, preferences (e.g., user preferences), services, files, file systems, hash values, metadata, parameters, traffic flows, policies, defined network management criteria, algorithms (e.g., network management algorithms, hash algorithms, data compression algorithms, data decompression algorithms, and/or other algorithm), protocols, interfaces, tools, and/or other information, to facilitate operation of the node 800, and control data flow between the node 800 and other components (e.g., another node(s), NMC, communication device, service server, file system, or other component) associated with the node 800.

The network component 804 can comprise network sub-components (e.g., Ethernet component (e.g., Ethernet ports and associated Ethernet sub-components), wireless communication connection component, or other network sub-component) that can enable the node 800 to network and communicate with one or more other nodes (e.g., nodes associated with a cluster), the NMC (e.g., NMC(s) of another node(s)), communication devices, service servers (e.g., service server(s) of another node(s)), and/or other components or devices. The network can employ IP for node-to-node communication between the node 800 and other nodes (e.g., other nodes associated with the cluster) associated with the node 800. For instance, a cluster of nodes of the storage system can comprise a back-end network, which can act as a backplane for the cluster, wherein can enable isolating node-to-node communication (e.g., between the node 800 and other nodes associated with the cluster) to a private, high-speed, low-latency network. The network component 804 can support and utilize desired network communication protocols to communicate with other components or devices in a communication network (e.g., Internet, intranet, customer network, or other type of communication network), wherein the network communication protocols can comprise, for example, NFS, SMB, hypertext transfer protocol (HTTP), file transfer protocol (FTP), Hadoop distributed file system (HDFS), OpenStack Swift, and/or other desired network communication protocols. The network component 804 also can comprise IP functionality that can allow the network component 804 and associated storage system to utilize communication protocols, such as IPv4 and IPv6, and be fully integrated with IPv4 and IPv6 environments. The node 800 can be associated with (e.g., assigned) respective IP addresses, including virtual IP addresses, that can be employed to facilitate enabling the node 800 to connect to client devices, other nodes, service servers, the NMC, and/or other components or devices. If the node 800 is offline for any reason, the IP addresses (e.g., virtual IP addresses) of the node 800 can be migrated (e.g., moved or transferred) to another node associated with the cluster (e.g., another node associated with a network of the cluster) to facilitate redistributing client devices to other nodes associated with the cluster if the node 800 is offline. In some embodiments, if IP addresses of the node 800 are going to be migrated to another node, the NMC 128a can facilitate such migration of IP addresses to the other node, for example, by executing a network address (removal) management stack of hooks to remove the IP addresses from interfaces of the node 800 and/or executing a network address (configuration) management stack of hooks to configure the IP addresses on interfaces of the other node. In certain embodiments, the NMC 128a can operate in conjunction with other components of the node network to facilitate such migration of IP addresses from the node 800 to the other node.

The interconnect component 806 can be associated with the network component 804 and/or other components to facilitate providing desired interconnects to the network component 804 and/or the other components. For instance, in some embodiments, a portion of the interconnect component 806 can be part of the network component 804. The interconnect component 806 can comprise various types of interconnects (e.g., interconnect sub-components) that can be utilized to connect the node 800 to other nodes of the cluster of nodes, connect various components (e.g., processor component 802, interface component 808, NMC 810, service server 812, data store 814, memory component 816, controller component 818, or other component) of the node 800, or connection the node 800 to other components (e.g., another node(s), NMC, client or communication device, service server, file system, or other component) of or associated with the storage system. The interconnects can comprise, for example, Ethernet interconnects or other low-latency interconnects (e.g., low-latency InfiniBand interconnects) that can be utilized to provide desirably fast and low-latency connections between respective components of or associated with the node 800. For instance, the memory component 816 (e.g., memory cache of the memory component 816) can communicate via a desirably fast (e.g., low-latency) interconnect (e.g., internal interconnect) of the interconnect component 806 to another memory component(s) of another node(s) of the cluster of nodes to desirably communicate or otherwise make available the data in the memory component 816 to the other memory component(s) or to access data in the other memory component(s), wherein such interconnect can have a significantly lower latency than accessing a hard disk drive of a node. The interconnect component 806 also can comprise desirably fast interconnects between different memory sub-components (e.g., different caches) of the memory component 816.

The interface component 808 can comprise various interfaces, such as, for example, network interfaces, application programming interfaces (APIs), interconnect interfaces, communication interfaces, a display screen, display interfaces, audio interfaces, haptic interface, and/or other desired interfaces, to facilitate (e.g., enable) transmitting or presenting information to a user or a device (e.g., service server, another node, or client or communication device, such as a computer, server, or mobile (e.g., smart) phone), or receiving information (e.g., query or request for a service; or request for information) from a service server or the NMC.

The NMC 810 can determine network address management stacks for configuration of network addresses on interfaces associated with the node 800 or other nodes of the group of nodes, determine network address management stacks for removal of network addresses from interfaces associated with the node 800 or other nodes of the group of nodes, execute hooks of a network address management stack to configure (or remove) a network address on (or from) an interface, and/or modify hooks of a network address management stack, in accordance with the defined network management criteria, such as more fully described herein. The NMC 810 also can coordinate and synchronize with one or more other NMCs (e.g., of or associated with one or more other nodes), and can exchange information with the one or more other NMCs, such as more fully described herein.

The service server 812 can facilitate handling client requests received from communication devices and provisioning services for the communication devices in response to the client requests. In some embodiments, the service server 812 can be a server message block (SMB) server that can employ a desired SMB protocol to facilitate establishing SMB sessions. For example, the service server 812 can employ the desired SMB protocol to facilitate servicing client requests with regard to data stored on the node.

In other embodiments, the service server 812 can be or can comprise a different type of service server, such as an NFS server that can comprise a distributed file system and can employ an NFS protocol that can enable the sharing of file directories and files with clients over the node network. Users (e.g., clients) can, for example, add files to a shared file directory, and those files are able to be shared with other users who have access to that file directory. It is to be appreciated and understood that, in other embodiments, the node 800 can comprise one or more other types of service servers, in addition to or as an alternative to service server 812.

The data store 814 can store data structures (e.g., user data, metadata), code structure(s) (e.g., modules, objects, hashes, classes, procedures) or instructions, information relating to files, file systems, communication connection operations, read operations, write operations, data storage operations, data or file search operations, nodes, network of nodes, service servers, communication devices, network addresses, interface identifiers, node identifiers, network address requests (e.g., network address configuration requests, or network address removal requests), hooks, network address management stacks, applications, operating systems, interface configuration systems, hardware or virtual platforms, characteristics associated with applications, operating systems, interface configuration systems, or hardware or virtual platforms, preferences (e.g., user preferences), services, files, file systems, hash values, metadata, parameters, traffic flows, policies, defined network management criteria, algorithms (e.g., network management algorithms, hash algorithms, data compression algorithms, data decompression algorithms, and/or other algorithm), protocols, interfaces, tools, and/or other information, to facilitate controlling operations associated with the node 800. The data store 814 can comprise volatile and/or non-volatile memory. In an aspect, the processor component 802 can be functionally coupled (e.g., through a memory bus) to the data store 814 in order to store and retrieve information desired to operate and/or confer functionality, at least in part, to the interface component 808, NMC 810, service server 812, data store 814, memory component 816, controller component 818, or other component, and/or substantially any other operational aspects of the node 800.

The memory component 816 can include one or more volatile or non-volatile memory sub-components (e.g., cache memory) that can be utilized to store data, such as the various types of data disclosed herein. The memory sub-components of the memory component 618 can comprise, for example, random access memory (RAM), synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), non-volatile RAM (NVRAM), and/or other desired type of memory. One or more memory sub-components can be one or more caches.

The controller component 818 can be or can comprise a disk controller that can enable the processor component 802, or portion thereof, to communicate with the data store 814 (e.g., a hard disk of the data store 814) or other type of storage media or storage drive (e.g., disk drive) of or associated with the node 800. The controller component 818 also can provide or facilitate providing an interface between the hard disk or disk drive and other components of the node 800.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methods that can be implemented in accordance with the disclosed subject matter can be further appreciated with reference to flowcharts in FIGS. 9-12. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 9:
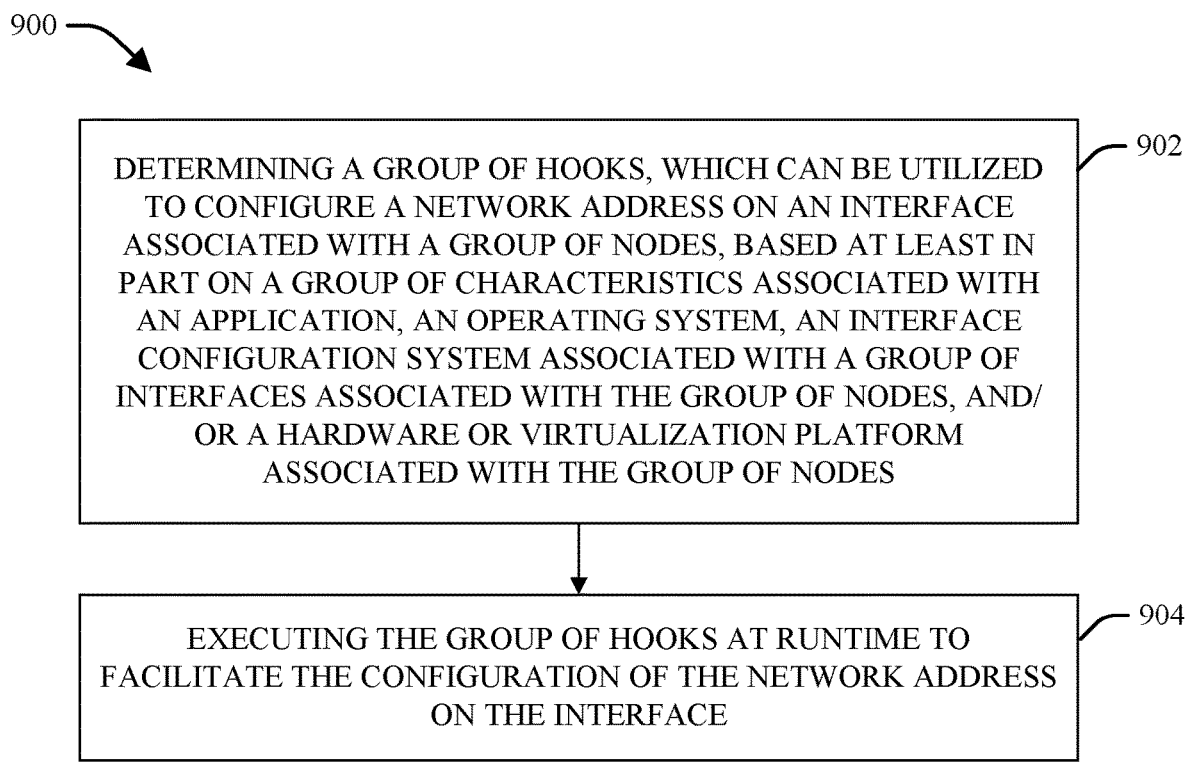
FIG. 9 illustrates a flow chart of an example method that can desirably perform and manage network address configuration in a distributed node network, in accordance with various aspects and embodiments of the disclosed subject matter.

FIG. 9 illustrates a flow chart of an example method 900 that can desirably (e.g., efficiently, suitably, or optimally) perform and manage network address configuration in a distributed node network, in accordance with various aspects and embodiments of the disclosed subject matter. The method 900 can be employed by, for example, a system comprising the NMC, a processor component (e.g., of or associated with the NMC), and/or data store (e.g., of or associated with the NMC and/or the processor component).

At 902, a group of hooks, which can be utilized to configure a network address on an interface associated with a group of nodes, can be determined based at least in part on a group of characteristics associated with an application, an operating system, an interface configuration system associated with a group of interfaces associated with the group of nodes, and/or a hardware or virtualization platform associated with the group of nodes. The NMC can determine the group of hooks, and an order (e.g., sequence) of respective hooks of the group of hooks, based at least in part on the group of characteristics associated with the application, the operating system, the interface configuration system, and/or the hardware or virtualization platform (e.g., application type or configuration of the application, operating system type or configuration of the operating system, type or configuration of interface configuration system, type or configuration of the hardware or virtualization platform, or other desired characteristic, such as described herein. The group of hooks can comprise one or more hooks that can be pre-configuration hooks, a network address configuration hook, and one or more hooks that can be post-configuration hooks, such as described herein.

At 904, the group of hooks can be executed at runtime to facilitate the configuration of the network address on the interface. The NMC, comprising the execution component, can execute the respective hooks of the group of hooks, in accordance with the determined order, at runtime to facilitate the configuration of the network address on the interface.

Figure 10:
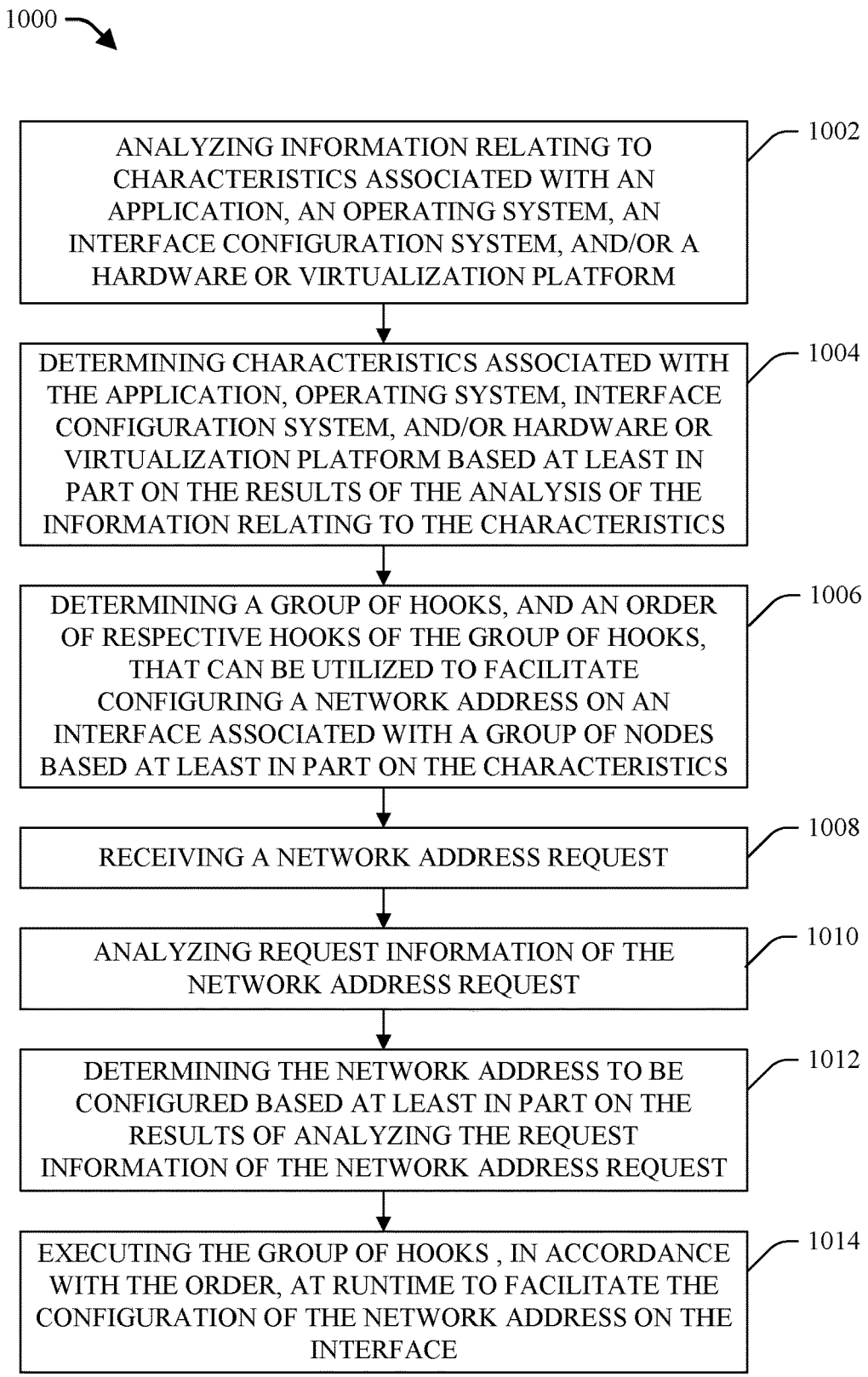
FIG. 10 presents a flow chart of an example method that can desirably perform and manage network address configuration in a distributed node network, in accordance with various aspects and embodiments of the disclosed subject matter.

FIG. 10 presents a flow chart of an example method 1000 that can desirably (e.g., efficiently, suitably, or optimally) perform and manage network address configuration in a distributed node network, in accordance with various aspects and embodiments of the disclosed subject matter. The method 1000 can be employed by, for example, a system comprising the NMC, a processor component (e.g., of or associated with the NMC), and/or data store (e.g., of or associated with the NMC and/or the processor component).

At 1002, information relating to characteristics associated with an application, an operating system, an interface configuration system, and/or a hardware or virtualization platform can be analyzed. The node network, comprising a group of nodes, can employ the application (e.g., one or more applications, comprising the application), the operating system, the interface configuration system associated with the group of interfaces associated with the group of nodes, and the hardware or virtualization platform. The NMC can analyze the information relating to the characteristics associated with the application (e.g., application type, configuration, or other characteristic associated with the application), the operating system (e.g., operating system type, configuration, or other characteristic associated with the operating system), the interface configuration system (e.g., type, configuration, or other characteristic associated with the interface configuration system), and/or the hardware or virtualization platform (e.g., type, configuration, or other characteristic associated with the hardware or virtualization platform).

At 1004, characteristics associated with the application, the operating system, the interface configuration system, and/or the hardware or virtualization platform can be determined based at least in part on the results of the analysis of the information relating to the characteristics. For instance, based at least in part on such analysis results, the NMC can determine the characteristics associated with the application, operating system, interface configuration system, and/or hardware or virtualization platform.

At 1006, a group of hooks, and an order of respective hooks of the group of hooks, that can be utilized to facilitate configuring a network address on an interface associated with a group of nodes can be determined based at least in part on the characteristics associated with the application, the operating system, the interface configuration system, and/or the hardware or virtualization platform. For instance, the NMC can determine the group of hooks, and the order (e.g., sequence) of the respective hooks of the group of hooks based at least in part on the characteristics associated with the application, the operating system, the interface configuration system, and/or the hardware or virtualization platform, wherein the group of hooks can be utilized to facilitate configuring a network address on an interface of the group of interfaces associated with the group of nodes. The group of hooks can comprise one or more hooks that can be pre-configuration hooks, a network address configuration hook, and one or more hooks that can be post-configuration hooks, such as described herein.

At 1008, a network address request can be received. The NMC can receive one or more network address requests, comprising the network address request, from an upper layer of the application.

At 1010, request information of the network address request can be analyzed. For each network address request, the NMC can analyze the request information of the network address request, wherein such request information can indicate one or more network addresses for which configuration on one or more interfaces of the group of interfaces can be requested.

At 1012, the network address to be configured can be determined based at least in part on the results of analyzing the request information of the network address request. For each network address request (e.g., in a request for configuration of one or more network addresses), based at least in part on the results of analyzing the request information, the NMC can determine the network address that is to be configured.

At 1014, the group of hooks can be executed, in accordance with the order, at runtime to facilitate the configuration of the network address on the interface. With regard to each network address of the one or more network addresses, the NMC, comprising the execution component, can execute the respective hooks of the group of hooks (e.g., the network address management stack), in accordance with the order, at runtime to facilitate the configuration of the network address on the interface. The network address can be configured on the desired interface based at least in part on the execution of the respective hooks of the group of hooks. In some embodiments, the NMC can employ multiple threads of the network address management stack, and the execution component can execute (e.g., in order) the respective hooks of the respective threads of the network address management stack in parallel.

Figure 11:
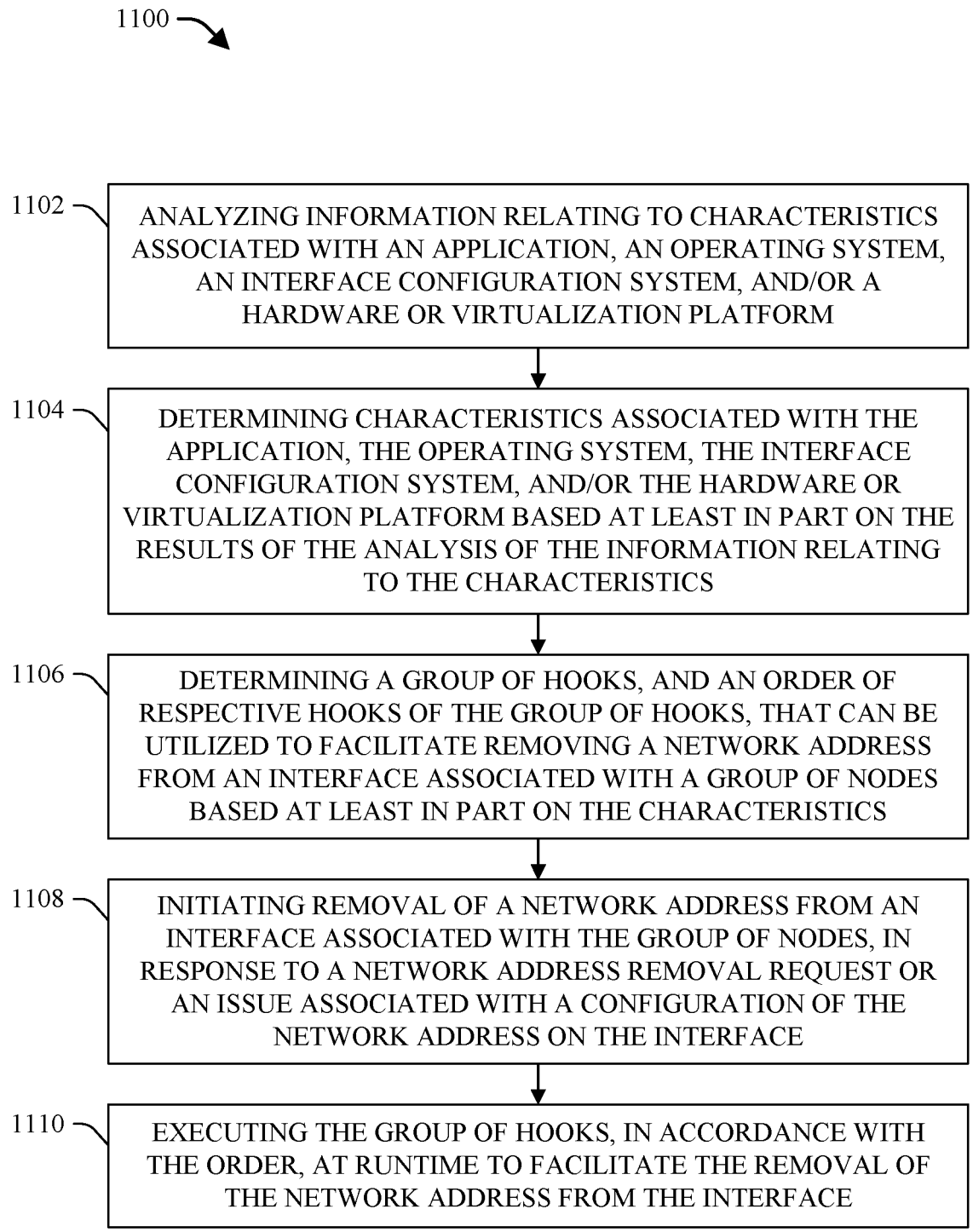
FIG. 11 depicts a flow chart of an example method that can desirably perform and manage network address configuration in a distributed node network, in accordance with various aspects and embodiments of the disclosed subject matter.

FIG. 11 depicts a flow chart of an example method 1100 that can desirably (e.g., efficiently, suitably, or optimally) perform and manage network address configuration in a distributed node network, in accordance with various aspects and embodiments of the disclosed subject matter. The method 1100 can be employed by, for example, a system comprising the NMC, a processor component (e.g., of or associated with the NMC), and/or data store (e.g., of or associated with the NMC and/or the processor component).

At 1102, information relating to characteristics associated with an application, an operating system, an interface configuration system, and/or a hardware or virtualization platform can be analyzed. The node network, comprising a group of nodes, can employ the application (e.g., one or more applications, comprising the application), the operating system, the interface configuration system associated with the group of interfaces associated with the group of nodes, and the hardware or virtualization platform. The NMC can analyze the information relating to the characteristics associated with the application (e.g., application type, configuration, or other characteristic associated with the application), the operating system (e.g., operating system type, configuration, or other characteristic associated with the operating system), the interface configuration system (e.g., type, configuration, or other characteristic associated with the interface configuration system), and/or the hardware or virtualization platform (e.g., type, configuration, or other characteristic associated with the hardware or virtualization platform).

At 1104, characteristics associated with the application, the operating system, the interface configuration system, and/or the hardware or virtualization platform can be determined based at least in part on the results of the analysis of the information relating to the characteristics. For instance, based at least in part on such analysis results, the NMC can determine the characteristics associated with the application, operating system, interface configuration system, and/or hardware or virtualization platform.

At 1106, a group of hooks, and an order of respective hooks of the group of hooks, that can be utilized to facilitate removing a network address from an interface associated with a group of nodes can be determined based at least in part on the characteristics associated with associated with the application, the operating system, the interface configuration system, and/or the hardware or virtualization platform. For instance, based at least in part on such characteristics, the NMC can determine the group of hooks, and the order (e.g., sequence) of the respective hooks of the group of hooks, wherein the group of hooks can be utilized to facilitate removing a network address from an interface of the group of interfaces associated with the group of nodes. The group of hooks can comprise one or more hooks that can be pre-removal hooks, a network address removal hook, and one or more hooks that can be post-removal hooks, such as described herein.

At 1108, removal of a network address from an interface associated with the group of nodes can be initiated, in response to a network address removal request or an issue associated with a configuration of the network address on the interface. The NMC can initiate removal of receive the network address from the interface, in response to receiving the network address removal request from the upper layer of the application, or in response to detecting an issue (e.g., a problem) with the configuration, or attempt to configure, the network address on the interface. The issue can be or can relate to, for example, the interface being determined (e.g., by the NMC) to be down or otherwise unavailable, a duplicate network address has been detected (e.g., by the NMC) on the node network, or some other type of issue where it is determined that removal of the network address from the interface can be warranted. The NMC can detect the issue based at least in part on information obtained through monitoring of the node network (e.g., by the application upper layer or the middleware) and/or obtained as a result of execution of a network address management stack (e.g., a (different) group of hooks) to configure or attempt to configure the network address on the interface. With regard to a network address removal request, the NMC can analyze the request information in the request, and, based at least in part on such analysis, can determine (e.g., identify) the network address, can determine the interface, and can determine that the request is to remove the network address from the interface (e.g., disassociate the network address from the interface).

At 1110, the group of hooks can be executed, in accordance with the order, at runtime to facilitate the removal of the network address from the interface. The NMC, comprising the execution component, can execute the respective hooks of the group of hooks (e.g., the network address management stack for removal of a network address from an interface), in accordance with the order, at runtime to facilitate the removal of the network address from the interface. The network address can be removed (e.g., disassociated or deconfigured) from the desired interface based at least in part on the execution of the respective hooks of the group of hooks.

Figure 12:
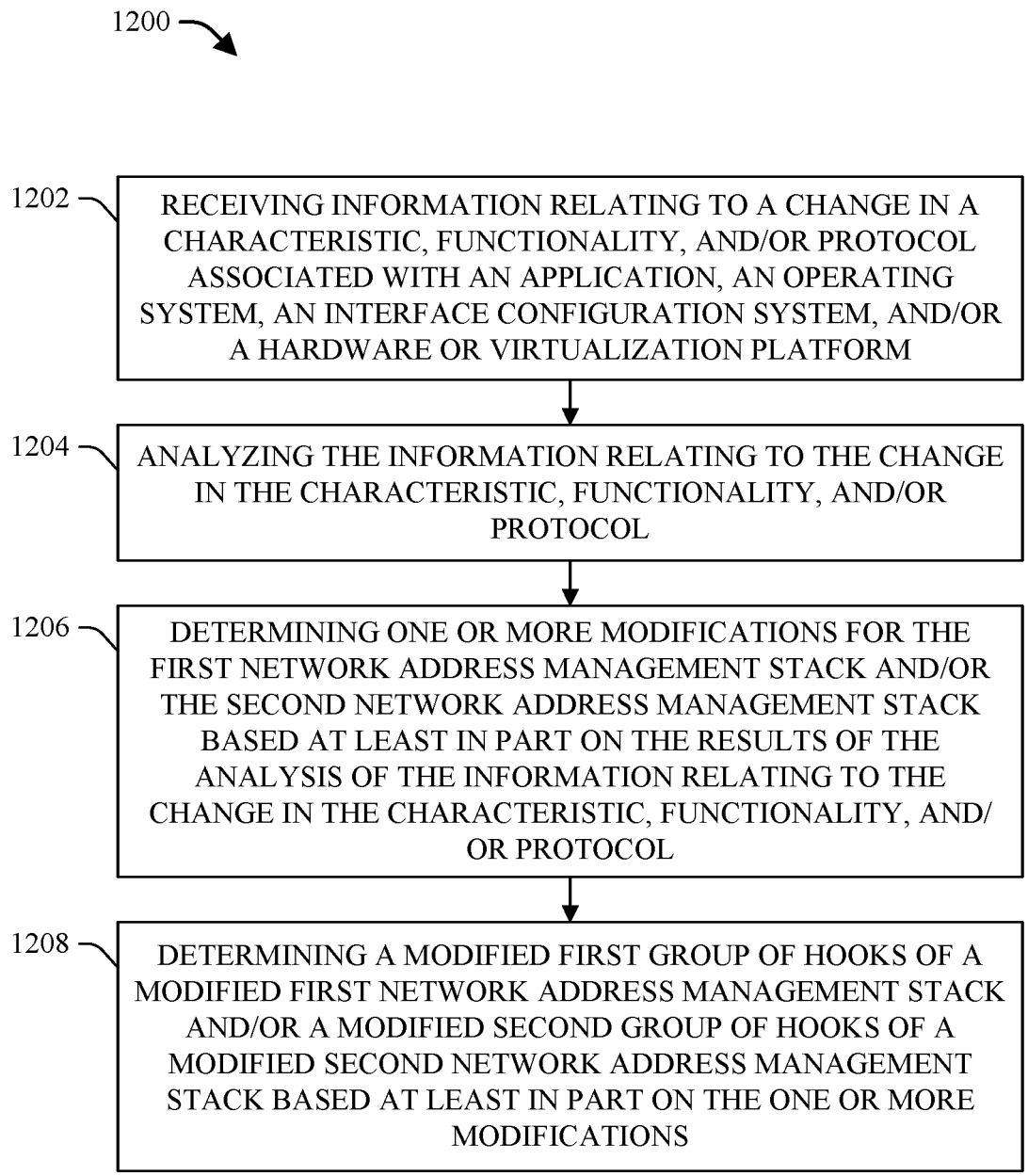
FIG. 12 depicts a flow chart of an example method that can desirably modify a network address management stack in response to a change in a characteristic, functionality, and/or protocol associated with an application, an interface configuration system, and/or a hardware or virtualization platform associated therewith, in accordance with various aspects and embodiments of the disclosed subject matter.

FIG. 12 depicts a flow chart of an example method 1200 that can desirably (e.g., efficiently, suitably, or optimally) modify a network address management stack in response to a change in a characteristic, functionality, and/or protocol associated with an application, an interface configuration system, and/or a hardware or virtualization platform associated therewith, in accordance with various aspects and embodiments of the disclosed subject matter. The method 1200 can be employed by, for example, a system comprising the NMC, a processor component (e.g., of or associated with the NMC), and/or data store (e.g., of or associated with the NMC and/or the processor component).

The NMC can previously have determined a first network address management stack, comprising a first group of hooks, for configuration of a network address on an interface of a group of interfaces associated with a group of nodes of a distributed node network, and a second network address management stack, comprising a second group of hooks, for removal of a network address from an interface of the group of interfaces, such as described herein (e.g., with regard to the method 900 of FIG. 9, the method 1000 of FIG. 10, and the method 1100 of FIG. 11, or as otherwise described herein).

At 1202, information relating to a change in a characteristic, functionality, and/or protocol associated with an application, an operating system, an interface configuration system, and/or a hardware or virtualization platform can be received. The NMC can receive the information, which can relate to the change in the characteristic, functionality, and/or protocol associated with the application, operating system, interface configuration system, and/or hardware or virtualization platform, from an upper layer of the application and/or from another source (e.g., a communication device associated with a user).

At 1204, the information relating to the change in the characteristic, functionality, and/or protocol can be analyzed. The NMC can analyze the information relating to the change in the characteristic, functionality, and/or protocol to facilitate identifying such change in the characteristic, functionality, and/or protocol and to facilitate determining a modification that can be made to the first network address management stack and/or the second network address management stack to account for such change.

At 1206, one or more modifications for the first network address management stack and/or the second network address management stack can be determined based at least in part on the results of the analysis of the information relating to the change in the characteristic, functionality, and/or protocol. At 1208, a modified first group of hooks of a modified first network address management stack and/or a modified second group of hooks of a modified second network address management stack can be determined based at least in part on the one or more modifications. The NMC can determine the one or more modifications (e.g., adjustments, alterations, or changes) that can be made to the first network address management stack and/or the second network address management stack to account for the change in the characteristic, functionality, and/or protocol associated with the application, interface configuration system, and/or hardware or virtualization platform. The one or more modifications can comprise adding a hook to, or removing a hook from, the first group of hooks of the first network address management stack, and/or modifying an order (e.g., order of execution) of the hooks of the first group of hooks, to determine and generate the modified first group of hooks of the modified first network address management stack. Additionally or alternatively, the one or more modifications can comprise adding a hook to, or removing a hook from, the second group of hooks of the second network address management stack, and/or modifying an order of the hooks of the second group of hooks, to generate the modified second group of hooks of the modified second network address management stack.

The NMC can store the modified first network address management stack and/or the modified second network address management stack in the data store. The NMC can utilize (e.g., execute) the modified first network address management stack to facilitate configuring a network address on an interface of the group of interfaces associated with the group of nodes (e.g., in response to a received network address request). The NMC also can utilize (e.g., execute) the modified second network address management stack to facilitate removing (e.g., disassociating or disconfiguring) a network address from an interface of the group of interfaces.

Figure 13:
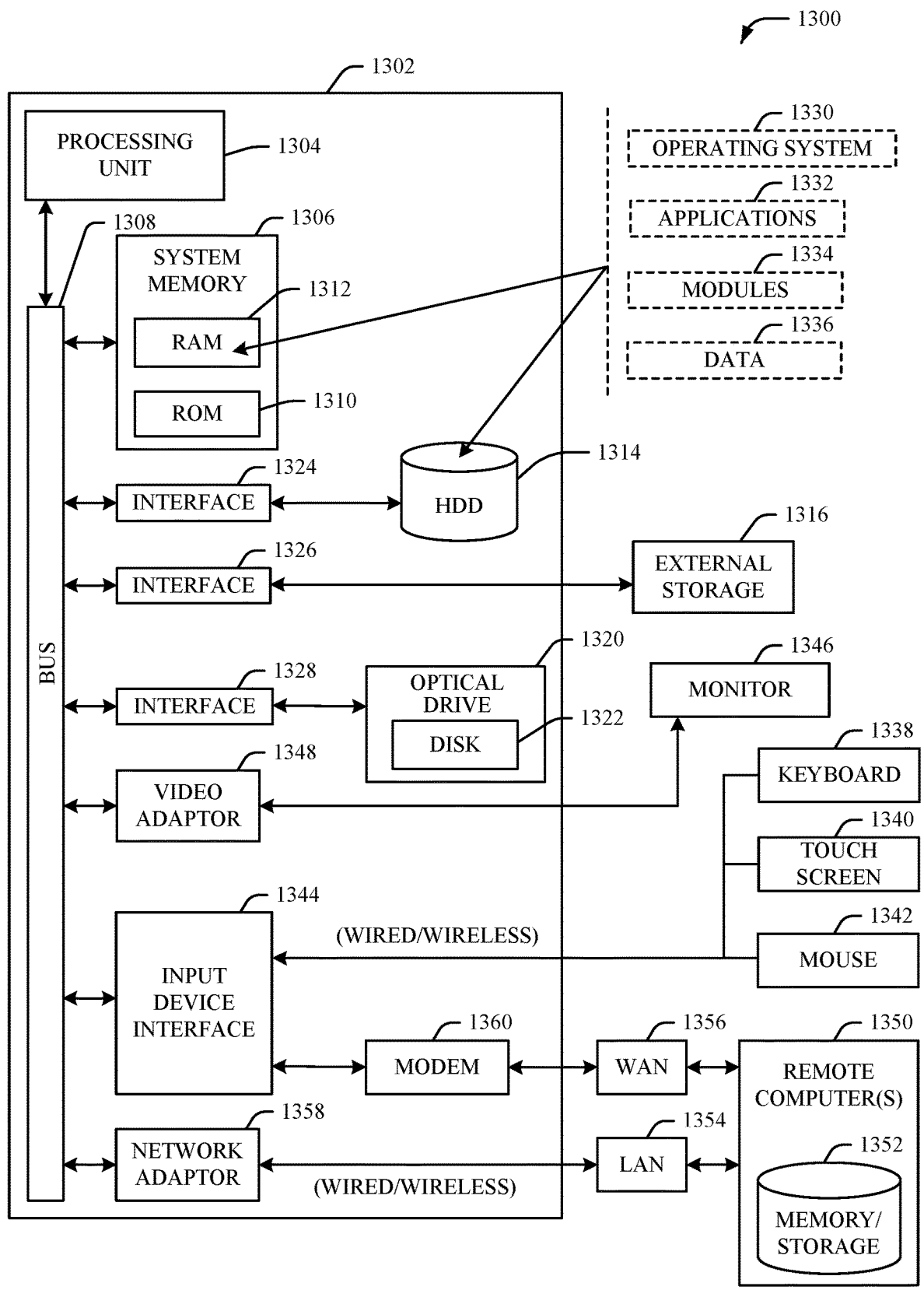
FIG. 13 illustrates an example block diagram of an example computing environment in which the various embodiments of the embodiments described herein can be implemented.

In order to provide additional context for various embodiments described herein, FIG. 13 and the following discussion are intended to provide a brief, general description of a suitable computing environment 1300 in which the various embodiments of the embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enable with a security module, such as a trusted processing module (TPM). For instance with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are example and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356, e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Various aspects or features described herein can be implemented as a method, apparatus, system, or article of manufacture using standard programming or engineering techniques. In addition, various aspects or features disclosed in the subject specification can also be realized through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or storage media. For example, computer-readable storage media can include but are not limited to magnetic storage devices (e.g., hard disk, floppy disk, magnetic strips, etc.), optical discs (e.g., compact disc (CD), digital versatile disc (DVD), blu-ray disc (BD), etc.), smart cards, and memory devices comprising volatile memory and/or non-volatile memory (e.g., flash memory devices, such as, for example, card, stick, key drive, etc.), or the like. In accordance with various implementations, computer-readable storage media can be non-transitory computer-readable storage media and/or a computer-readable storage device can comprise computer-readable storage media.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. A processor can be or can comprise, for example, multiple processors that can include distributed processors or parallel processors in a single machine or multiple machines. Additionally, a processor can comprise or refer to an integrated circuit, an application specific integrated circuit (ASIC), a digital signal processor (DSP), a programmable gate array (PGA), a field programmable gate array (FPGA), a programmable logic controller (PLC), a complex programmable logic device (CPLD), a state machine, a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor may also be implemented as a combination of computing processing units.

A processor can facilitate performing various types of operations, for example, by executing computer-executable instructions. When a processor executes instructions to perform operations, this can include the processor performing (e.g., directly performing) the operations and/or the processor indirectly performing operations, for example, by facilitating (e.g., facilitating operation of), directing, controlling, or cooperating with one or more other devices or components to perform the operations. In some implementations, a memory can store computer-executable instructions, and a processor can be communicatively coupled to the memory, wherein the processor can access or retrieve computer-executable instructions from the memory and can facilitate execution of the computer-executable instructions to perform operations.

In certain implementations, a processor can be or can comprise one or more processors that can be utilized in supporting a virtualized computing environment or virtualized processing environment. The virtualized computing environment may support one or more virtual machines representing computers, servers, or other computing devices. In such virtualized virtual machines, components such as processors and storage devices may be virtualized or logically represented.

In the subject specification, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Additionally, the disclosed memory components of systems or methods herein are intended to comprise, without being limited to comprising, these and any other suitable types of memory.

As used in this application, the terms "component," "system," "platform," "framework," "layer," "interface," "agent," and the like, can refer to and/or can include a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, computer-executable instructions, a program, and/or a computer. By way of illustration, both an application running on a server and the server can be a component. One or more components may reside within a process and/or thread of execution and a component may be localized on one computer and/or distributed between two or more computers.

In another example, respective components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

A communication device, such as described herein, can be or can comprise, for example, a computer, a laptop computer, a server, a phone (e.g., a smart phone), an electronic pad or tablet, an electronic gaming device, electronic headwear or bodywear (e.g., electronic eyeglasses, smart watch, augmented reality (AR)/virtual reality (VR) headset, or other type of electronic headwear or bodywear), a set-top box, an Internet Protocol (IP) television (IPTV), Internet of things (IoT) device (e.g., medical device, electronic speaker with voice controller, camera device, security device, tracking device, appliance, or other IoT device), or other desired type of communication device.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, the terms "example," "exemplary," and/or "demonstrative" are utilized to mean serving as an example, instance, or illustration. For the avoidance of doubt, the subject matter disclosed herein is not limited by such examples. In addition, any aspect or design described herein as an "example," "exemplary," and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive, in a manner similar to the term "comprising" as an open transition word, without precluding any additional or other elements.

It is to be appreciated and understood that components (e.g., NMC, node, network address management stack, hook, cluster, network, processor component, data store, or other component), as described with regard to a particular system or method, can include the same or similar functionality as respective components (e.g., respectively named components or similarly named components) as described with regard to other systems or methods disclosed herein.

What has been described above includes examples of systems and methods that provide advantages of the disclosed subject matter. It is, of course, not possible to describe every conceivable combination of components or methods for purposes of describing the disclosed subject matter, but one of ordinary skill in the art may recognize that many further combinations and permutations of the disclosed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   determining, by a system comprising a processor, a group of hooks, and an order of respective hooks of the group of hooks in a network address management stack of hooks, that is to be utilized to configure a network address on an interface associated with a group of nodes based at least in part on a characteristic associated with a node of the group of nodes; and
   executing, by the system, the group of hooks at runtime to facilitate the configuration of the network address on the interface, wherein the executing comprises:
   in accordance with the order:
      executing a first subgroup of hooks of the group of hooks prior to executing a network address configuration hook of the group of hooks, wherein the first subgroup of hooks is associated with a first subgroup of index values that is associated with a first sign;
      executing the network address configuration hook to configure the network address on the interface; and
      executing a second subgroup of hooks of the group of hooks after the executing of the network address configuration hook, wherein the second subgroup of hooks is associated with a second subgroup of index values that is associated with a second sign.

2. The method of claim 1, wherein the respective hooks comprise respective configuration operations that are performed to configure the network address on the interface.

3. The method of claim 1, wherein the determining comprises determining the group of hooks, and the order of the respective hooks of the group of hooks in the network address management stack of hooks, based at least in part on characteristics associated with an application associated with the node, an operating system associated with the node, an interface configuration system that is associated with a group of interfaces comprising the interface, or a hardware or virtualization platform associated with the application or the interface configuration system, wherein the characteristics comprise the characteristic associated with the node, and
wherein the executing comprises executing the respective hooks at the runtime, in accordance with the order of the respective hooks, to facilitate the configuring of the network address on the interface.

4. The method of claim 1, further comprising:
based at least in part on executing at least one hook of the group of hooks, communicating, by the system, configuration-related information to a kernel of the node to facilitate having the kernel configure the network address on the interface.

5. The method of claim 1, further comprising:
in connection with executing a first hook of the second subgroup of hooks, determining, by the system, whether the configuration of the network address on the interface is successful based at least in part on an analysis of the configuration of the network address on the interface, wherein the interface is associated with the node; and
in response to determining that the configuration of the network address on the interface is successful, and in connection with executing a second hook of the second subgroup of hooks, communicating, by the system, a notification message to other nodes of the group of nodes to notify the other nodes that the configuration of the network address on the interface is successful.

6. The method of claim 1, wherein the interface is associated with the node, wherein the group of hooks comprises a first hook that verifies that the interface is in a usable state before the configuring of the network address on the interface, a second hook that is able to coordinate with other nodes of the group of nodes for exclusive access to the network address, a third hook that facilitates the configuring of the network address on the interface, a fourth hook that facilitates duplicate network address detection, a fifth hook that facilitates sending messages to the other nodes to notify the other nodes that the interface is associated with the network address, a sixth hook that determines whether the configuring of the network address on the interface has been performed successfully, or a seventh hook that facilitates sending a notification message that indicates whether the configuring of the network address on the interface has been performed successfully.

7. The method of claim 1, further comprising:
receiving, by the system, information indicating characteristics, comprising the characteristic, associated with the node are being changed, wherein the characteristics are associated with an application associated with the node, an operating system associated with the node, an interface configuration system that is associated with a group of interfaces comprising the interface, or a hardware or virtualization platform associated with the application or the interface configuration system;
determining, by the system, a modification to the group of hooks based at least in part on the change in the characteristics; and
modifying, by the system, the group of hooks, based at least in part on the modification, to generate a modified group of hooks.

8. The method of claim 1, wherein the network address is a first network address, wherein the interface is a first interface, wherein a network address management stack of hooks comprises the group of hooks, and wherein the executing comprises:
in response to a first request to configure the first network address, executing a first thread of the network address management stack of hooks at the runtime to perform a first group of operations to facilitate configuring the first network address on the first interface; and
in parallel with the executing of the first thread and the performing of the first group of operations, and in response to a second request to configure a second network address, executing a second thread of the network address management stack of hooks at the runtime to perform a second group of operations to facilitate configuring the second network address on a second interface associated with the group of nodes.

9. The method of claim 1, wherein the group of hooks is a first group of hooks, wherein the order of the respective hooks of the first group of hooks is a first order of respective first hooks of the first group of hooks, wherein the runtime is a first runtime, and wherein the method further comprises:
determining, by the system, a second group of hooks, and a second order of execution of respective second hooks of the second group of hooks, that is to be utilized to facilitate removal of the network address from the interface based at least in part on the characteristic associated with the node; and
executing, by the system, the second group of hooks in the second order at a second runtime to facilitate removing the network address from being configured on the interface.

10. The method of claim 9, wherein the interface is associated with the node, wherein a first connection is associated with the network address and the interface, wherein the second group of hooks comprises a first hook that sends a first notification message to a service to notify the service that the network address is being removed from the interface, a second hook that is able to prevent a second connection from being established to the network address, a third hook that enables a waiting period to wait for the service to indicate that the removal of the network address from the interface can proceed, a fourth hook that enables discontinuation of one or more transmission control protocol connections, a fifth hook that enables the removal of the network address from the interface, a sixth hook that enables release of exclusive access of the interface to the network address, or a seventh hook that sends a second notification message to notify the service of the removal of the network address from the interface.

11. The method of claim 1, wherein the interface is associated with the node, and wherein the method further comprises:
during the executing of the group of hooks, determining, by the system, that the configuration of the network address on the interface is not able to be performed due to the interface or the node being determined to be unavailable or offline; and in response to determining that the configuration of the network address on the interface is not able to be performed, canceling, by the system, the configuration of the network address on the interface.

12. The method of claim 1, wherein the node is a first node, wherein the interface is a first interface associated with the first node, wherein the group of hooks is a first group of hooks, and wherein the method further comprises:
subsequent to the configuration of the network address on the interface, and based at least in part on executing a hook of the first group of hooks, detecting, by the system, a duplicate network address associated with a second interface associated with the first node or a second node of the group of nodes, wherein the hook relates to duplicate network address detection, and wherein the duplicate network address is a duplicate of the network address and was configured on the second interface prior to the network address being configured on the first interface;
determining, by the system, that the network address is to be removed from the interface based at least in part on the detecting of the duplicate network address; and
in response to determining that the network address is to be removed from the interface, initiating, by the system, removal of the network address from the first interface based at least in part on a second group of hooks that facilitate removal of the network address from the first interface.

13. A system, comprising:
a memory that stores computer executable components; and
a processor that executes computer executable components stored in the memory, wherein the computer executable components comprise:
a network management component that determines a group of hooks, and a sequence of respective hooks of the group of hooks in a network address management stack of hooks, that is to be utilized to configure a network address on an interface associated with a group of nodes based at least in part on an attribute associated with a node of the group of nodes or an interface configuration system associated with the group of nodes; and
an execution component that executes the group of hooks at runtime to facilitate the configuration of the network address on the interface, wherein, in accordance with the sequence, the execution component executes a first subgroup of hooks of the group of hooks prior to execution of a network address configuration hook of the group of hooks, executes the network address configuration hook to configure the network address on the interface, and executes a second subgroup of hooks of the group of hooks after the execution of the network address configuration hook, wherein the first subgroup of hooks is associated with a first subgroup of index values that is associated with a first sign, and wherein the second subgroup of hooks is associated with a second subgroup of index values that is associated with a second sign.

14. The system of claim 13, wherein the respective hooks comprise respective configuration operations that are performed to configure the network address on the interface.

15. The system of claim 13, wherein the network management component determines the group of hooks, and the sequence of the respective hooks of the group of hooks in the network address management stack of hooks, that is to be utilized to configure the network address on the interface based at least in part on attributes, comprising the attribute, associated with the node, an application associated with the node, an operating system associated with the node, the interface configuration system that is associated with a group of interfaces comprising the interface, or a hardware or virtualization platform associated with the node or the interface configuration system, and
wherein the execution component executes the respective hooks at the runtime, in accordance with the sequence of the respective hooks, to facilitate the configuring of the network address on the interface.

16. The system of claim 13, wherein the interface is associated with the node, wherein the group of hooks comprises a first hook that verifies that the interface is in a usable state before the configuring of the network address on the interface, a second hook that is able to coordinate with other nodes of the group of nodes for exclusive access to the network address, a third hook that facilitates the configuring of the network address on the interface, a fourth hook that facilitates duplicate network address detection, a fifth hook that facilitates communication of messages to the other nodes to notify the other nodes that the interface is associated with the network address, a sixth hook that determines whether the configuring of the network address on the interface has been performed successfully, or a seventh hook that facilitates communication of a notification message that indicates whether the configuring of the network address on the interface has been performed successfully.

17. The system of claim 13, wherein the group of hooks is a first group of hooks, wherein the sequence of the respective hooks of the first group of hooks is a first sequence of respective first hooks of the first group of hooks, wherein the runtime is a first runtime,
wherein the network management component determines a second group of hooks, and a second sequence of execution of respective second hooks of the second group of hooks, that is to be utilized to facilitate removal of the network address from the interface based at least in part on the attribute associated with the node or the interface configuration system, and
wherein the execution component executes the respective second hooks of the second group of hooks, in accordance with the second sequence, at a second runtime to facilitate removal of the network address from being configured on the interface.

18. The system of claim 13, wherein the network address is an Internet protocol version 4 address or an Internet protocol version 6 address.

19. A non-transitory machine-readable medium, comprising executable instructions that, when executed by a processor, facilitate performance of operations, comprising:
determining a set of hooks, and an order of execution of respective hooks of the set of hooks, that is to be employed to configure a network address on an interface associated with a set of nodes based at least in part on a characteristic associated with a node of the set of nodes or an interface configuration system associated with the set of nodes, wherein the respective hooks comprise respective network address configuration operations; and
executing the respective hooks of the set of hooks at runtime, in accordance with the order, to facilitate the configuration of the network address on the interface, wherein the executing comprises:

in accordance with the order:
- executing a first subset of hooks of the set of hooks before execution of a network address configuration hook of the set of hooks, wherein the first subset of hooks is associated with a first subset of index values that is associated with a first sign;
- executing the network address configuration hook to configure the network address on the interface; and
- executing a second subset of hooks of the set of hooks subsequent to the executing of the network address configuration hook, wherein the second subset of hooks is associated with a second subset of index values that is associated with a second sign.

20. The non-transitory machine-readable medium of claim 19, wherein the set of hooks is a first set of hooks, wherein the respective hooks are respective first hooks, wherein the order is a first order, wherein the runtime is a first runtime, and wherein the operations further comprise:
- determining a second set of hooks, and a second order of execution of respective second hooks of the second set of hooks, that is to be employed to facilitate removal of the network address from the interface based at least in part on the characteristic associated with the node or the interface configuration system; and
- executing the respective second hooks of the second set of hooks, in accordance with the second order, at a second runtime to facilitate removing the network address from being configured on the interface.

\* \* \* \* \*